US012591309B2

(12) United States Patent
Qi et al.

(10) Patent No.: US 12,591,309 B2
(45) Date of Patent: Mar. 31, 2026

(54) HAPTIC FEEDBACK SUBSTRATE AND HAPTIC FEEDBACK APPARATUS

(71) Applicant: BOE Technology Group Co., Ltd., Beijing (CN)

(72) Inventors: Dexing Qi, Beijing (CN); Yuju Chen, Beijing (CN); Hui Hua, Beijing (CN); Yingzi Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 417 days.

(21) Appl. No.: 18/034,549

(22) PCT Filed: Mar. 25, 2022

(86) PCT No.: PCT/CN2022/083145
§ 371 (c)(1),
(2) Date: Apr. 28, 2023

(87) PCT Pub. No.: WO2023/178676
PCT Pub. Date: Sep. 28, 2023

(65) Prior Publication Data
US 2024/0329739 A1 Oct. 3, 2024

(51) Int. Cl.
G06F 3/041 (2006.01)
G06F 3/01 (2006.01)
G06F 3/044 (2006.01)
(52) U.S. Cl.
CPC .......... *G06F 3/016* (2013.01); *G06F 3/04164* (2019.05); *G06F 3/0445* (2019.05); *G06F 3/0446* (2019.05)

(58) Field of Classification Search
None
See application file for complete search history.

(56) References Cited

U.S. PATENT DOCUMENTS

2009/0250267 A1    10/2009  Huebel et al.
2012/0075221 A1*    3/2012  Yasuda ................ H10N 30/081
                                                          345/173
(Continued)

FOREIGN PATENT DOCUMENTS

CN        112527122  A     3/2021
CN        113366411  A     9/2021
(Continued)

*Primary Examiner* — Krishna P Neupane
(74) *Attorney, Agent, or Firm* — ArentFox Schiff LLP; Michael Fainberg

(57) ABSTRACT

Provides are a haptic feedback substrate and apparatus. The haptic feedback substrate includes: a base substrate; a first electrode layer, the first electrode layer is electrically connected to a ground voltage input end; a piezoelectric film layer at one side of the first electrode layer facing away from the base substrate; a second electrode layer at one side of the piezoelectric film layer facing away from the base substrate, the second electrode layer is divided into vibration zones, each vibration zone includes at least one second electrode, second electrodes in each vibration zone are electrically connected to the same drive voltage input end, second electrodes in different vibration zones are electrically connected to different drive voltage input ends; the first and second electrode layers form an alternating electric field, the piezoelectric film layer vibrates under the action of the alternating electric field and drive the base substrate to resonate.

26 Claims, 35 Drawing Sheets

(56)     References Cited

U.S. PATENT DOCUMENTS

| | | | |
|---|---|---|---|
| 2013/0016042 A1 | 1/2013 | Makinen et al. | |
| 2016/0209922 A1 | 7/2016 | Kim et al. | |
| 2016/0313793 A1* | 10/2016 | Hong | G06F 3/016 |
| 2017/0255263 A1 | 9/2017 | Letendre | |
| 2018/0081441 A1* | 3/2018 | Pedder | G06F 3/03547 |
| 2020/0143791 A1* | 5/2020 | Halbach | B06B 1/0629 |
| 2022/0100297 A1 | 3/2022 | Tille et al. | |
| 2022/0203402 A1 | 6/2022 | Sakamoto | |

FOREIGN PATENT DOCUMENTS

| | | | |
|---|---|---|---|
| JP | 2015179544 A | 10/2015 | |
| JP | 2021047819 A | 3/2021 | |
| KR | 20110071521 A | 6/2011 | |
| KR | 20120023241 A | 3/2012 | |
| KR | 20160088526 A | 7/2016 | |
| KR | 20170034992 A | 3/2017 | |
| KR | 20190136572 A | 12/2019 | |

* cited by examiner

1

HAPTIC FEEDBACK SUBSTRATE AND HAPTIC FEEDBACK APPARATUS

CROSS-REFERENCE TO RELATED APPLICATIONS

This application is a National Stage of International Application No. PCT/CN2022/083145, filed Mar. 25, 2022, which is hereby incorporated by reference in its entirety.

FIELD

The present disclosure relates to the technical field of sensors, and particularly relates to a haptic feedback substrate and a haptic feedback apparatus.

BACKGROUND

Haptics, a focus of current technological development, enables interaction between a terminal and a human body through haptic sense.

SUMMARY

Embodiments of the present disclosure provide a haptic feedback substrate and a haptic feedback apparatus. A specific solution is as follows.

A haptic feedback substrate provided in an embodiment of the present disclosure includes: a base substrate; a first electrode layer on the base substrate, where the first electrode layer is electrically connected to a ground voltage input end; a piezoelectric film layer at one side of the first electrode layer facing away from the base substrate; and a second electrode layer at one side of the piezoelectric film layer facing away from the base substrate, where the second electrode layer is divided into a plurality of vibration zones, each vibration zone includes at least one second electrode, the second electrodes in each vibration zone are electrically connected to the same drive voltage input end, and the second electrodes in different vibration zones are electrically connected to different drive voltage input ends, where the first electrode layer and the second electrode layer are configured to form an alternating electric field, and the piezoelectric film layer is configured to vibrate under the action of the alternating electric field and drive the base substrate to resonate.

In a possible implementation mode, the haptic feedback substrate provided in embodiments of the present disclosure further includes a wiring layer at one side of the piezoelectric film layer facing away from the base substrate, where the wiring layer includes a plurality of wires, and the second electrodes in each vibration zone are electrically connected to the same drive voltage input end through the wires.

In a possible implementation mode, in the haptic feedback substrate provided in embodiments of the present disclosure, the piezoelectric film layer includes piezoelectric connectors, and orthographic projections of the wires on the base substrate are located within the range of orthographic projections of the piezoelectric connectors on the base substrate.

In a possible implementation mode, in the haptic feedback substrate provided in embodiments of the present disclosure, the piezoelectric film layer further includes a plurality of piezoelectric parts distributed in an array, and orthographic projections of the piezoelectric parts on the base substrate overlap orthographic projections of the second electrodes on the base substrate; and the piezoelectric parts are connected to the piezoelectric connectors, and the piezoelectric connector is arranged between the adjacent piezoelectric parts.

In a possible implementation mode, in the haptic feedback substrate provided in embodiments of the present disclosure, the orthographic projections of the piezoelectric connectors on the base substrate are in one-to-one correspondence to the orthographic projections of the wires on the base substrate.

In a possible implementation mode, in the haptic feedback substrate provided in embodiments of the present disclosure, the piezoelectric film layer further includes a plurality of piezoelectric parts distributed in an array, and the plurality of piezoelectric parts and the connectors are of an integrally formed entire-surface structure.

In a possible implementation mode, in the haptic feedback substrate provided in embodiments of the present disclosure, each vibration zone includes a plurality of second electrodes, the plurality of second electrodes constitute one column, and the two adjacent second electrodes in the same column are electrically connected through the wires.

In a possible implementation mode, in the haptic feedback substrate provided in embodiments of the present disclosure, the two adjacent second electrodes in the same column are electrically connected through a plurality of independent wires arranged in a row direction.

In a possible implementation mode, in the haptic feedback substrate provided in embodiments of the present disclosure, orthographic projections of the plurality of independent wires arranged in the row direction on the base substrate are located between orthographic projections of the two adjacent second electrodes on the base substrate.

In a possible implementation mode, in the haptic feedback substrate provided in embodiments of the present disclosure, when the piezoelectric film layer includes the plurality of piezoelectric parts distributed in an array, the piezoelectric film layer further includes piezoelectric buffer parts at one end of a first piezoelectric part and one end of a last piezoelectric part in the same column of piezoelectric parts, and the piezoelectric buffer parts are connected to the piezoelectric parts through a plurality of independent piezoelectric connectors arranged in the row direction; the haptic feedback substrate further includes first binding parts and second binding parts arranged on the same layer as the second electrodes, and the first binding parts and the second binding parts are located on the corresponding piezoelectric buffer parts, respectively; and the first binding parts are electrically connected to the second electrodes through a plurality of independent wires arranged in the row direction, the second binding parts are electrically connected to the second electrodes through a plurality of independent wires arranged in the row direction, and the first binding parts and/or the second binding parts are electrically connected to the drive voltage input ends.

In a possible implementation mode, in the haptic feedback substrate provided in embodiments of the present disclosure, when the piezoelectric film layer is of an entire-surface structure, the haptic feedback substrate further includes first binding parts and second binding parts arranged on the same layer as the second electrodes, and the first binding parts and the second binding parts are located on the piezoelectric film layer separately; and the first binding parts are electrically connected to the second electrodes through a plurality of independent wires arranged in the row direction, the second binding parts are electrically connected to the second electrodes through a plurality of independent wires arranged in the row direction, and the first binding parts and/or the second binding parts are electrically connected to the drive voltage input ends.

In a possible implementation mode, in the haptic feedback substrate provided in embodiments of the present disclosure, the first binding part and the second binding part that are electrically connected to each column of second electrodes are symmetrically arranged with respect to a center line of the base substrate in the row direction.

In a possible implementation mode, in the haptic feedback substrate provided in embodiments of the present disclosure, the piezoelectric buffer parts have a smaller size than the piezoelectric parts.

In a possible implementation mode, in the haptic feedback substrate provided in embodiments of the present disclosure, each vibration zone includes one second electrode, and all the second electrodes are electrically connected to different wires.

In a possible implementation mode, in the haptic feedback substrate provided in embodiments of the present disclosure, all the second electrodes are distributed in an array, all the wires electrically connected to a first row of second electrodes and a last row of second electrodes are directly led out from ends of the second electrodes, and all the wires electrically connected to the other rows of second electrodes are led out from gaps between two adjacent columns of second electrodes.

In a possible implementation mode, in the haptic feedback substrate provided in embodiments of the present disclosure, in the other rows of second electrodes, the wires electrically connected to some rows of second electrodes are led out to one side of the first row of second electrodes, and the wires electrically connected to the other rows of second electrodes are led out to one side of the last row of second electrodes.

In a possible implementation mode, in the haptic feedback substrate provided in embodiments of the present disclosure, each vibration zone includes at least two second electrodes in the same column, all the vibration zones in the same column are independent of each other, and the two adjacent second electrodes in each vibration zone are electrically connected through the wires.

In a possible implementation mode, in the haptic feedback substrate provided in embodiments of the present disclosure, the two adjacent second electrodes in each vibration zone are electrically connected through a plurality of independent wires arranged in a row direction.

In a possible implementation mode, in the haptic feedback substrate provided in embodiments of the present disclosure, orthographic projections of the plurality of independent wires arranged in the row direction on the base substrate are located between orthographic projections of the two adjacent second electrodes on the base substrate.

In a possible implementation mode, in the haptic feedback substrate provided in embodiments of the present disclosure, the same column includes two vibration zones, and the second electrodes in the two vibration zones in the same column each are the same in number.

In a possible implementation mode, in the haptic feedback substrate provided in embodiments of the present disclosure, when the piezoelectric film layer includes the plurality of piezoelectric parts distributed in an array, the piezoelectric film layer further includes piezoelectric buffer parts at one end of a first piezoelectric part and one end of a last piezoelectric part in the same column of piezoelectric parts, and the piezoelectric buffer parts are connected to the piezoelectric parts through a plurality of independent piezoelectric connectors arranged in the row direction; the haptic feedback substrate further includes first binding parts and second binding parts arranged on the same layer as the second electrodes, and the first binding parts and the second binding parts are located on the corresponding piezoelectric buffer parts, respectively; and the second electrodes in one vibration zone of the two vibration zones in the same column are electrically connected to the first binding part through a plurality of independent wires arranged in the row direction, the second electrodes in the other vibration zone of the two vibration zones in the same column are electrically connected to the second binding part through a plurality of independent wires arranged in the row direction, and the first binding parts and the second binding parts are electrically connected to the corresponding drive voltage input ends.

In a possible implementation mode, in the haptic feedback substrate provided in embodiments of the present disclosure, when the piezoelectric film layer is of an entire-surface structure, the haptic feedback substrate further includes first binding parts and second binding parts arranged on the same layer as the second electrodes, and the first binding parts and the second binding parts are located on the piezoelectric film layer separately; and the second electrodes in one vibration zone of the two vibration zones in the same column are electrically connected to the first binding part through a plurality of independent wires arranged in the row direction, the second electrodes in the other vibration zone of the two vibration zones in the same column are electrically connected to the second binding part through a plurality of independent wires arranged in the row direction, and the first binding parts and the second binding parts are electrically connected to the corresponding drive voltage input ends.

In a possible implementation mode, in the haptic feedback substrate provided in embodiments of the present disclosure, the first binding part and the second binding part corresponding to the two vibration zones in the same column are symmetrically arranged with respect to a center line of the base substrate in the row direction.

In a possible implementation mode, in the haptic feedback substrate provided in embodiments of the present disclosure, the piezoelectric buffer parts have a smaller size than the piezoelectric parts.

In a possible implementation mode, in the haptic feedback substrate provided in embodiments of the present disclosure, the first electrode layer is of an entire-surface structure.

In a possible implementation mode, the haptic feedback substrate provided in embodiments of the present disclosure further includes an auxiliary electrode layer between the first electrode layer and the piezoelectric film layer, where the auxiliary electrode layer is electrically connected to the first electrode layer, and the auxiliary electrode layer has higher conductivity than the first electrode layer.

In a possible implementation mode, in the haptic feedback substrate provided in embodiments of the present disclosure, the auxiliary electrode layer includes a plurality of auxiliary wires extending in a column direction and arranged in the row direction, all the auxiliary wires are uniformly arranged, and orthographic projections of all the auxiliary wires on the base substrate are located between orthographic projections of the two adjacent columns of second electrodes on the base substrate in a spaced manner.

In a possible implementation mode, in the haptic feedback substrate provided in embodiments of the present disclosure, the auxiliary electrode layer further includes: third binding parts electrically connected to one ends of the auxiliary wires, and fourth binding parts electrically connected to the other ends of the auxiliary wires; and the third binding parts and/or the fourth binding parts are electrically connected to the ground voltage input end.

In a possible implementation mode, in the haptic feedback substrate provided in embodiments of the present disclosure, when the piezoelectric film layer is of an entire-surface structure, the piezoelectric film layer exposes the third binding parts and the fourth binding parts.

In a possible implementation mode, in the haptic feedback substrate provided in embodiments of the present disclosure, the third binding parts and the fourth binding parts are symmetrically arranged with respect to centers of the auxiliary wires.

In a possible implementation mode, in the haptic feedback substrate provided in embodiments of the present disclosure, the first electrode layer is made of a transparent material, and the auxiliary electrode layer is made of metal.

In a possible implementation mode, in the haptic feedback substrate provided in embodiments of the present disclosure, a material of the first electrode layer includes at least one of ITO, IZO, IGZO, and AZO, and a material of the auxiliary electrode layer includes at least one of Pb, Au, Ti, Ag, Mo, Cu, W, and Cr.

In a possible implementation mode, in the haptic feedback substrate provided in embodiments of the present disclosure, the first electrode layer includes a plurality of first electrodes distributed in an array, and the first electrodes are in one-to-one correspondence to the second electrodes.

In a possible implementation mode, in the haptic feedback substrate provided in embodiments of the present disclosure, orthographic projections of the first electrodes on the base substrate substantially overlap the orthographic projections of the second electrodes on the base substrate.

In a possible implementation mode, in the haptic feedback substrate provided in embodiments of the present disclosure, overlapping parts of the first electrode layer, the piezoelectric film layer and the second electrode layer constitute a piezoelectric device, and the piezoelectric device is arranged at a position of a wave peak and/or wave trough of vibration of the base substrate.

In a possible implementation mode, in the haptic feedback substrate provided in embodiments of the present disclosure, when the piezoelectric devices are arranged at positions of both the wave peak and the wave trough, the piezoelectric device at the position of the wave peak has the same size as the piezoelectric device at the position of the wave trough, and alternatively, the piezoelectric device at the position of the wave peak has a greater size than the piezoelectric device at the position of the wave trough.

In a possible implementation mode, in the haptic feedback substrate provided in embodiments of the present disclosure, when the piezoelectric device at the position of the wave peak has a greater size than the piezoelectric device at the position of the wave trough, the piezoelectric device at the position of the wave peak is configured to drive the base substrate to vibrate, and the piezoelectric device at the position of the wave trough is configured to serve as a pressure detector.

In a possible implementation mode, in the haptic feedback substrate provided in embodiments of the present disclosure, a material of the piezoelectric film layer includes at least one of $Pb(Zr,Ti)O_3$, $AlN$, $ZnO$, $BaTiO_3$, $PbTiO_3$, $KNbO_3$, $LiNbO_3$, $LiTaO_3$, and $La_3Ga_5SiO_{14}$.

Accordingly, an embodiment of the present disclosure further provides a haptic feedback apparatus, which includes the haptic feedback substrate provided in any one of the embodiments of the present disclosure.

DETAILED DESCRIPTION OF THE EMBODIMENTS

Figure 1:
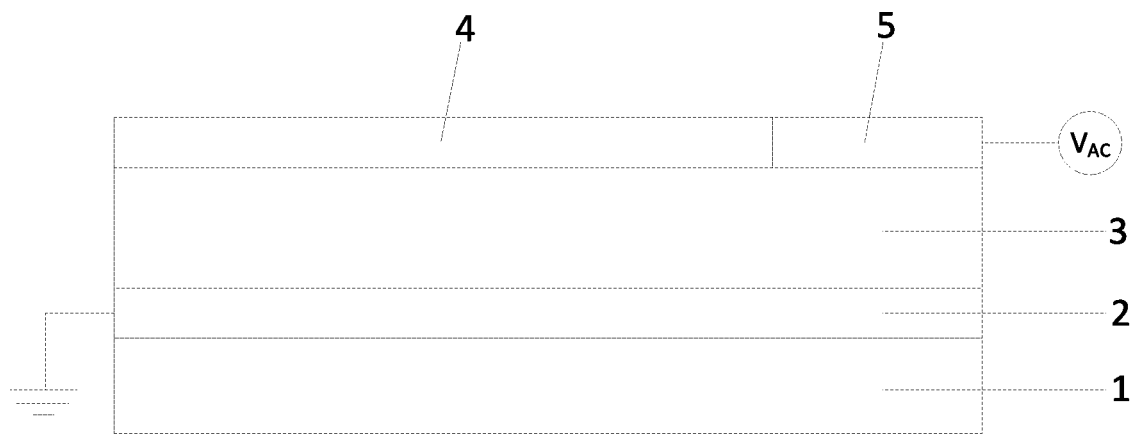
FIG. 1 is a schematic structural diagram of a haptic feedback substrate according to an embodiment of the present disclosure.

For making objectives, technical solutions and advantages of embodiments of the present disclosure clearer, the technical solutions of the embodiments of the present disclosure will be clearly and completely described below in conjunction with the accompanying drawings in the embodiments of the present disclosure. Apparently, the embodiments described are some embodiments rather than all embodiments of the present disclosure. The embodiments in the present disclosure and features of the embodiments can be combined with each other without conflict. Based on the embodiments of the present disclosure, all other embodiments obtained by those of ordinary skill in the art without making creative efforts fall within the scope of protection of the present disclosure.

Unless otherwise defined, technical or scientific terms used in the present disclosure should have ordinary meanings as understood by those of ordinary skill in the art to which the present disclosure belongs. "Include", "comprise", and other similar words used in the present disclosure indicate that elements or objects before the word include elements or objects after the word and their equivalents, without excluding other elements or objects. "Connection", "connected", and other similar words are not limited to physical or mechanical connections, but can include electrical connections, which can be direct or indirect. "Inside", "outside", "upper", "lower", etc. are only used to indicate a relative positional relation. After an absolute position of the described object changes, the relative positional relation may also change accordingly.

It should be noted that a size and a shape of each figure in the drawings do not reflect a true scale, but only for illustrating the present disclosure. Throughout the drawings, identical or similar reference numerals denote identical or similar elements or elements having identical or similar functions.

A haptic feedback device based on vibration has a general working principle of achieving touch functions such as virtual keys by bonding a piezoelectric plate, a linear motor or a piezoelectric film to a base substrate and applying pulsed excitation.

A film piezoelectric material has characteristics of a high dielectric constant and transparency, thereby being very suitable for a sensor structure integrated with screens. A $Pb(Zr,Ti)O_3$ (PZT) piezoelectric ceramic has been widely used at present because of its excellent piezoelectric property.

In an existing haptic feedback device based on piezoelectric films, electrical signals are simultaneously applied to all the piezoelectric films. In this way, all actuators are in an excited state simultaneously, such that on one hand, overall power consumption of the device is increased, and on the other hand, fine control of a haptic feedback effect is not facilitated.

In view of this, an embodiment of the present disclosure provides a haptic feedback substrate. As shown in FIGS. 1, 4C, 5C, 6C, 7B, 8C and 9B, FIGS. 4C, 5C, 6C, 7B, 8C and 9B are planar structural diagrams of the haptic feedback substrate, and FIG. 1 is a schematic diagram of a section in direction CC' in FIGS. 4C, 5C, 6C, 7B, 8C and 9B. The haptic feedback substrate includes:

a base substrate 1;

a first electrode layer 2 on the base substrate 1, where the first electrode layer 2 is electrically connected to a ground voltage input end;

a piezoelectric film layer 3 at one side of the first electrode layer 2 facing away from the base substrate 1; and a second electrode layer 4 at one side of the piezoelectric film layer 3 facing away from the base substrate 1, where the second electrode layer 4 is divided into a plurality of vibration zones AA, each vibration zone AA includes at least one second electrode 41, the second electrodes 41 in each vibration zone AA are electrically connected to the same drive voltage input end (which is configured to apply an alternating current voltage signal), and the second electrodes 41 in different vibration zones AA are electrically connected to different drive voltage input ends, where the first electrode layer 2 and the second electrode layer 4 are configured to form an alternating electric field, and the piezoelectric film layer 3 is configured to vibrate under the action of the alternating electric field and drive the base substrate 1 to resonate.

In some embodiments, as shown in FIGS. 4C, 5C, 6C, 7B, 8C and 9B, overlapping parts of the first electrode layer 2, the piezoelectric film layer 3 and the second electrode layer 4 constitute a piezoelectric device.

According to the haptic feedback substrate provided in the embodiment of the present disclosure, the second electrode layer 4 is divided into the plurality of vibration zones AA, each vibration zone AA includes at least one second electrode 41, the second electrodes 41 in each vibration zone AA are electrically connected to the same drive voltage input end, and the second electrodes 41 in different vibration zones AA are electrically connected to different drive voltage input ends. In this way, the piezoelectric device may be driven in a zoned manner, such that on one hand, overall power consumption of the device may be reduced, and on the other hand, fine control of a haptic feedback effect may be facilitated.

During specific implementation, with reference to FIG. 1, for example, a ground voltage signal may be applied to the first electrode layer 2, and the alternating current voltage signal may be applied to the second electrode layer 4, such that the alternating electric field may be formed between the first electrode layer 2 and the second electrode layer 4, and the alternating electric field has the same frequency as the alternating current voltage signal. Under the action of the alternating electric field, the piezoelectric film layer 3 is deformed and generates a vibration signal, and the vibration signal has the same frequency as the alternating electric field. When the frequency of the vibration signal is close to or equal to a natural frequency of the base substrate 1, the base substrate 1 resonates, an amplitude is enhanced, and a haptic feedback signal is generated. When touching a surface of the base substrate 1, a finger may obviously feel change of a friction force. In actual application, the friction force on the surface of the base substrate 1 may be adjusted through resonance between the piezoelectric film layer 3 and the base substrate 1, such that texture rendering of an object is achieved on the surface of the base substrate 1.

In some embodiments, the greater a voltage value of the alternating current voltage signal, the greater the amplitude of vibration of the base substrate 1, and the more obvious haptic experience of a user. Therefore, a size of the haptic feedback signal may be achieved by adjusting the voltage value of the alternating current voltage signal.

During specific implementation, the base substrate may be a substrate made of glass, or a substrate made of silicon or SiO$_2$, or a substrate made of sapphire, or a substrate made of a metal wafer, which is not limited herein. Those skilled in the art may provide the base substrate according to actual application needs.

Figure 2:
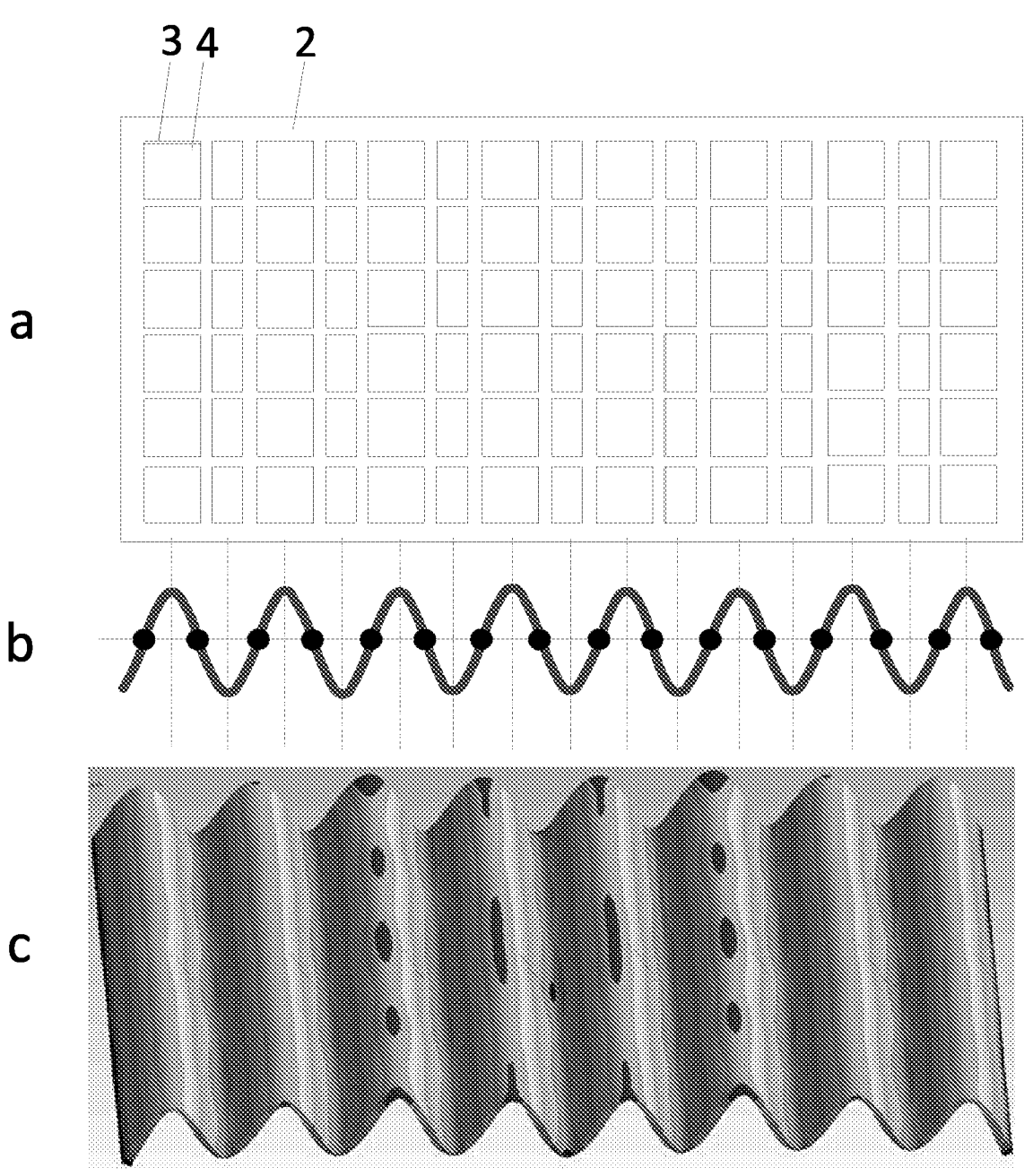
FIG. 2 shows a planar structural diagram and a schematic simulation diagram of a haptic feedback substrate according to an embodiment of the present disclosure.
Figure 3:
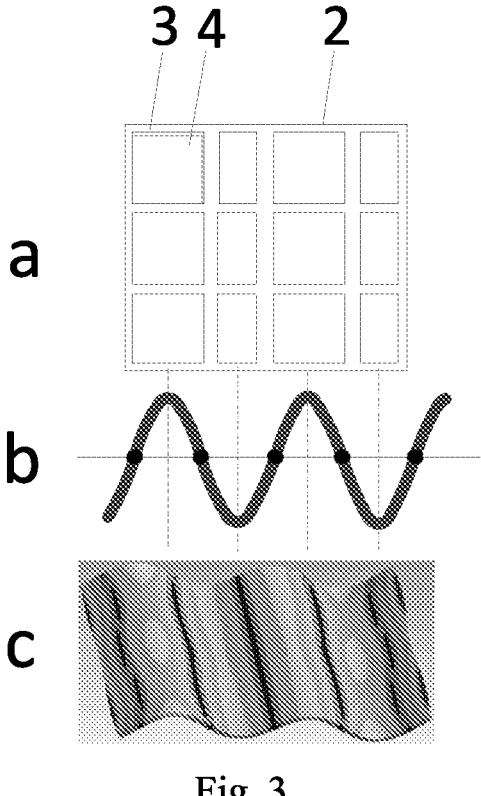
FIG. 3 shows a planar structural diagram and a schematic simulation diagram of another haptic feedback substrate according to an embodiment of the present disclosure.

During specific implementation, in the haptic feedback substrate provided in the embodiment of the present disclosure, as shown in FIGS. 2 and 3, FIGS. 2 and 3 are planar structural diagrams of a haptic feedback substrate, and a difference between FIG. 2 and FIG. 3 is that the base substrates 1 have different sizes in the figures. The overlapping parts of the first electrode layer 2, the piezoelectric film layer 3 and the second electrode layer 4 constitute the piezoelectric device, and the piezoelectric device may be arranged at a position of a wave peak and/or wave trough of the vibration of the base substrate 1.

In some embodiments, when there is one piezoelectric device, the piezoelectric device may be located at a position of a wave peak or a wave trough of a natural vibration mode of the base substrate 1. When there are a plurality of piezoelectric devices, the piezoelectric devices may be all located at the positions of the wave peaks, or all located at the positions of the wave troughs, and alternatively, some piezoelectric devices may be located at the positions of the wave peaks while the other piezoelectric devices are located at the positions of the wave troughs. It should be noted that the piezoelectric device may be arranged near the position of the wave peak or wave trough according to actual demand, so as to be compatible with various natural vibration modes (such as a 0*5 node vibration mode, a 0*6 node vibration mode, a 0*7 node vibration mode, . . . , and a 0*16 node vibration mode) of the base substrate 1. A specific position of the piezoelectric device on the base substrate 1 may be adjusted with a maximum amplitude as a target, which is not limited in the embodiment.

In some embodiments, as shown in FIGS. 2 and 3, there may be a plurality of piezoelectric devices, and the plurality of piezoelectric devices are arranged at one side of the base substrate 1 in an array. When there are a plurality of piezoelectric devices, each piezoelectric device may be driven independently, alternatively, all the piezoelectric devices in the same column may be driven as a whole (column drive), and alternatively, all the piezoelectric devices may be driven as a whole. Subsequent embodiments will introduce specific structures of the column drive and independent drive in detail.

In some embodiments, the number of columns of piezoelectric devices is related to a size and a resonance frequency of the base substrate. As shown in a in FIG. 2, the base substrate has length×width of 117 mm×68 mm, a natural vibration mode has 16 nodes at an alternating current voltage of 23080 Hz, and piezoelectric devices are arranged at positions of wave peaks and wave troughs, respectively, where there are 15 columns of piezoelectric devices in total. As shown in 'a' in FIG. 3, the base substrate has length× width of 35 mm×26 mm, a natural vibration mode has 5 nodes at an alternating current voltage of 21894 Hz, and piezoelectric devices are arranged at positions of wave peaks and wave troughs, respectively, where there are 4 columns of piezoelectric devices in total.

FIG. 2 and FIG. 3 show schematic diagrams 'a' of arrangement structures of piezoelectric devices on two types of base substrates according to embodiments of the present disclosure. FIG. 2 shows a vibration waveform 'b' of a natural vibration mode of 0×16 node of the base substrate (black dot positions represent nodes). FIG. 3 shows a vibration waveform 'b' of a natural vibration mode of 0×5 node of the base substrate (black dot positions represent nodes). FIG. 2 shows a modal simulation diagram 'c' of the natural vibration mode of 0×16 node of the base substrate. FIG. 3 shows a modal simulation diagram 'c' of the natural vibration mode of 0×5 node of the base substrate. The plurality of piezoelectric devices shown in 'a' of FIG. 2 and 'a' of FIG. 3 are arranged on the base substrate 1 in an array. 15 columns×6 rows of piezoelectric devices are arranged on the base substrate 1 shown in 'a' of FIG. 2, and 4 columns×3 rows of piezoelectric devices are arranged on the base substrate 1 shown in 'a' of FIG. 3. One row of piezoelectric devices are arranged at each of positions of wave peaks or wave troughs of the natural vibration modes of 0×16 node and 0×5 node. When an alternating current voltage having a frequency of 23080 Hz is applied between the first electrode layer 2 and the second electrode layer 4 of the piezoelectric device shown in 'a' of FIG. 2, and an alternating current voltage having a frequency of 21894 Hz is applied between the first electrode layer 2 and the second electrode layer 4 of the piezoelectric device shown in 'a' of FIG. 3, the base substrates 1 in both FIGS. 2 and 3 resonate. When touching a surface of the base substrate 1, a finger may obviously feel change of a friction force, and further haptic feedback is achieved.

The node refers to one column of points (corresponding to the column drive) whose amplitudes are always 0 in the natural vibration mode of the base substrate 1. The vibration mode of 0*16 node indicates that there are 16 columns of points on the base substrate 1 in the mode, whose amplitudes are always 0, as shown in 'b' of FIG. 2. The vibration mode of 0*5 node indicates that there are 5 columns of points on the base substrate 1 in the mode, whose amplitudes are always 0, as shown in 'b' of FIG. 3.

In actual application, firstly, a natural frequency and a natural vibration mode of the base substrate 1 may be determined through simulation according to parameters, such as a mass, a shape and a material, of the base substrate 1, (when there are a plurality of frequencies and natural vibration modes, a natural frequency and a natural vibration mode that have large amplitudes may be selected), positions of wave peaks and wave troughs of vibration of the base substrate 1 may be determined, and then piezoelectric devices may be placed at or near the positions of the wave peaks and/or the wave troughs.

During specific implementation, when a plurality of piezoelectric devices are arranged in the haptic feedback substrate, in the same vibration mode, an amplitude of the base substrate 1 is larger and the haptic feedback signal is more uniform. The number of piezoelectric devices to be arranged in the haptic feedback substrate may be determined according to factors such as a wiring space, and the piezoelectric devices may be arranged as many as possible within an allowable range of the wiring space. The embodiment does not limit the specific number of piezoelectric devices.

In order to reduce power consumption of a device, some embodiments of the present disclosure mainly uses three modes of column drive, partial drive of piezoelectric devices in the same column and independent drive. Certainly, all piezoelectric devices may be driven as a whole.

The haptic feedback substrate of some embodiments of the present disclosure is described as below with a size of the base substrate shown in FIG. 2 as an example, that is, 15 columns×6 rows of piezoelectric devices are arranged on the base substrate 1, for example, such that a specific structure of the 15 columns×6 rows of piezoelectric devices is illustrated more clearly. In the following description, the embodiment of the present disclosure only illustrates a structure of some columns×some rows.

During specific implementation, as shown in FIGS. 4C, 5C, 6C, 7B, 8C and 9B, the haptic feedback substrate provided in embodiments of the present disclosure further includes a wiring layer 5 at one side of the piezoelectric film layer 3 facing away from the base substrate 1, where the wiring layer 5 includes a plurality of wires 51, and the second electrodes 41 in each vibration zone AA are electrically connected to the same drive voltage input end through the wires 51. In this way, the piezoelectric devices may be driven in a zoned manner.

In the related art, a piezoelectric film device based on piezoelectric films mainly includes the first electrode layer, the piezoelectric film layer, the second electrode layer, an insulating layer and the wiring layer that are stacked on the base substrate, where the wiring layer is electrically connected to the second electrode layer through a via hole penetrating the insulating layer, the first electrode layer is grounded, and the second electrode layer is connected to the drive voltage input end by means of the wiring layer. Since a film of the piezoelectric film layer (PZT) is thick, increase in a gradient angle of the insulating layer at an edge of the thick film may be caused, and further fracture of the wiring layer because of a large gradient angle of the insulating layer may be caused.

Figure 4A:
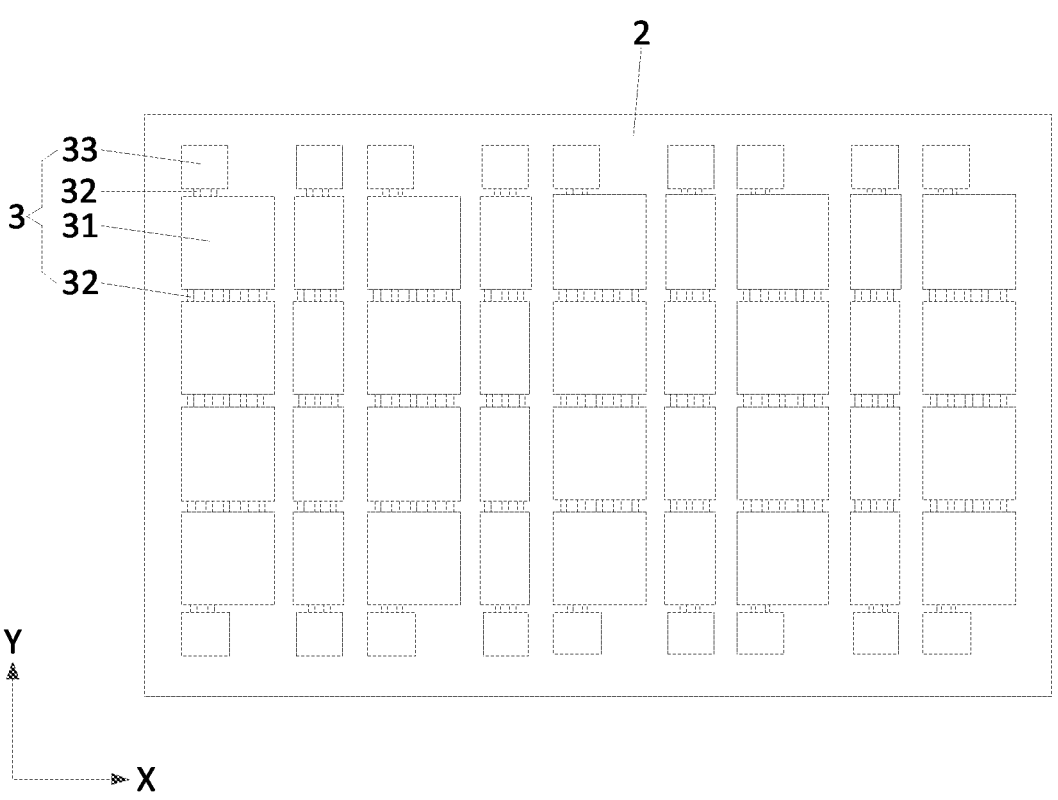
FIG. 4A is a planar structural diagram of a haptic feedback substrate according to an embodiment of the present disclosure.
Figure 4B:
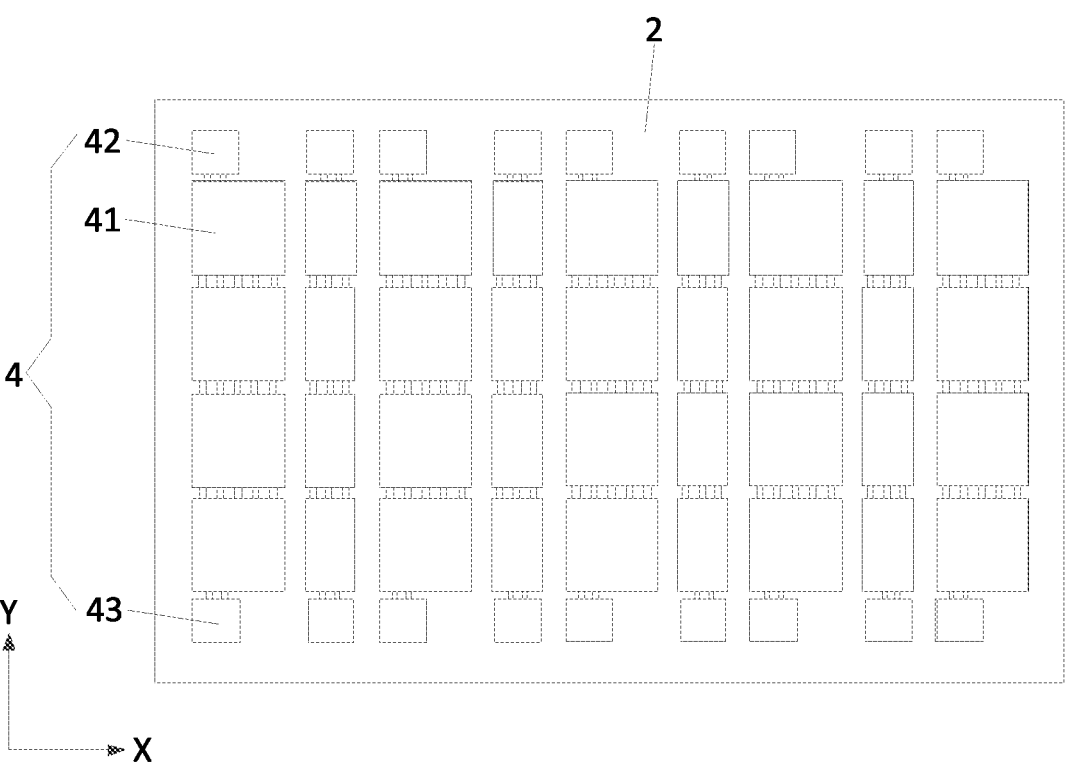
FIG. 4B is a planar structural diagram based on FIG. 4A.
Figure 4C:
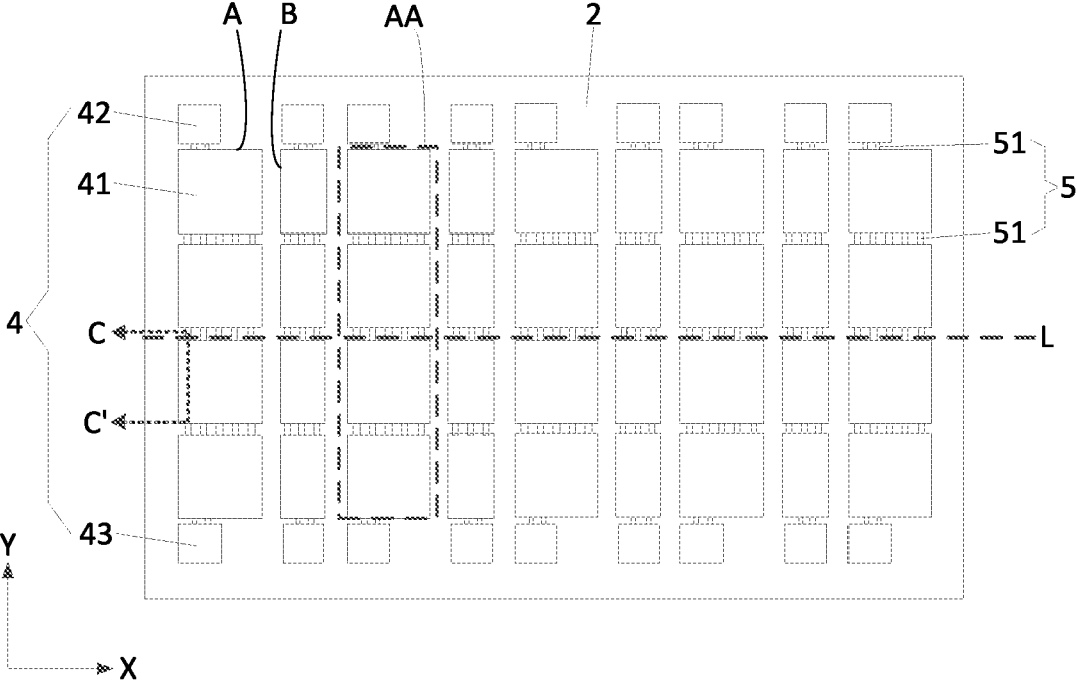
FIG. 4C is a planar structural diagram based on FIG. 4B.
Figure 5A:
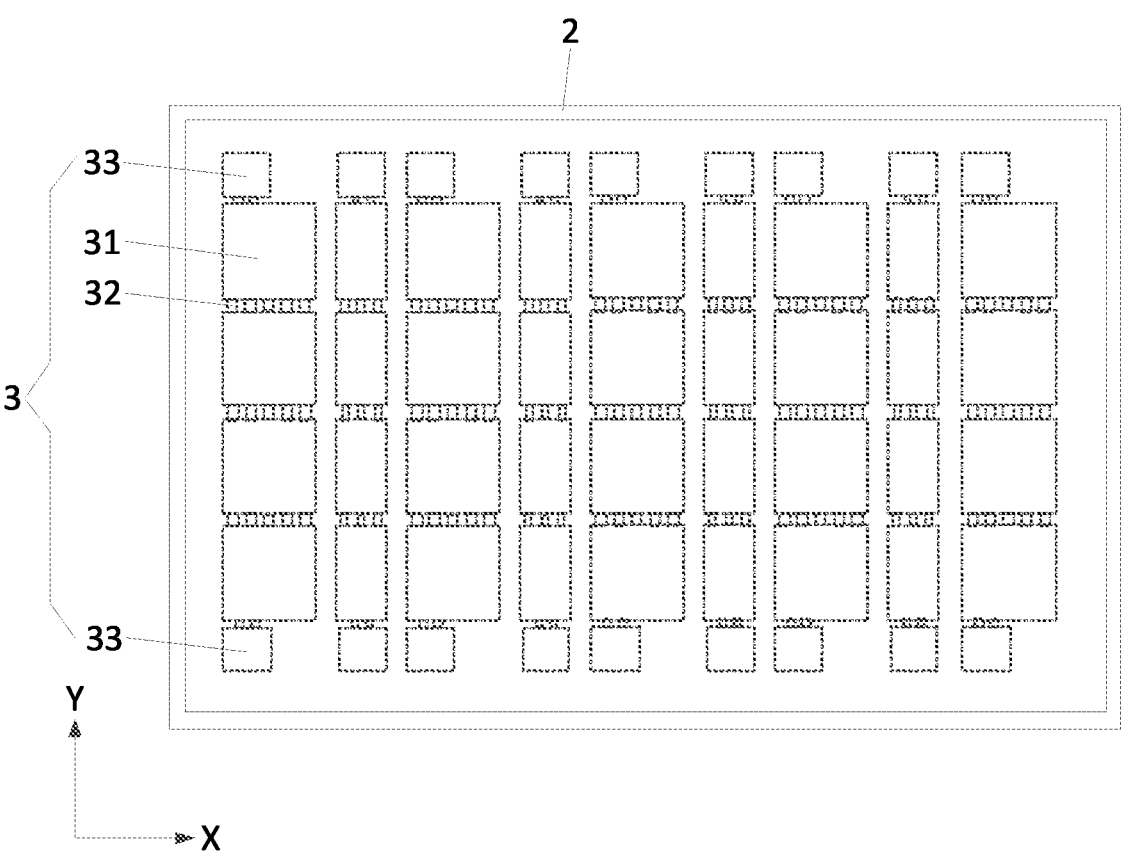
FIG. 5A is a planar structural diagram of another haptic feedback substrate according to an embodiment of the present disclosure.
Figure 5B:
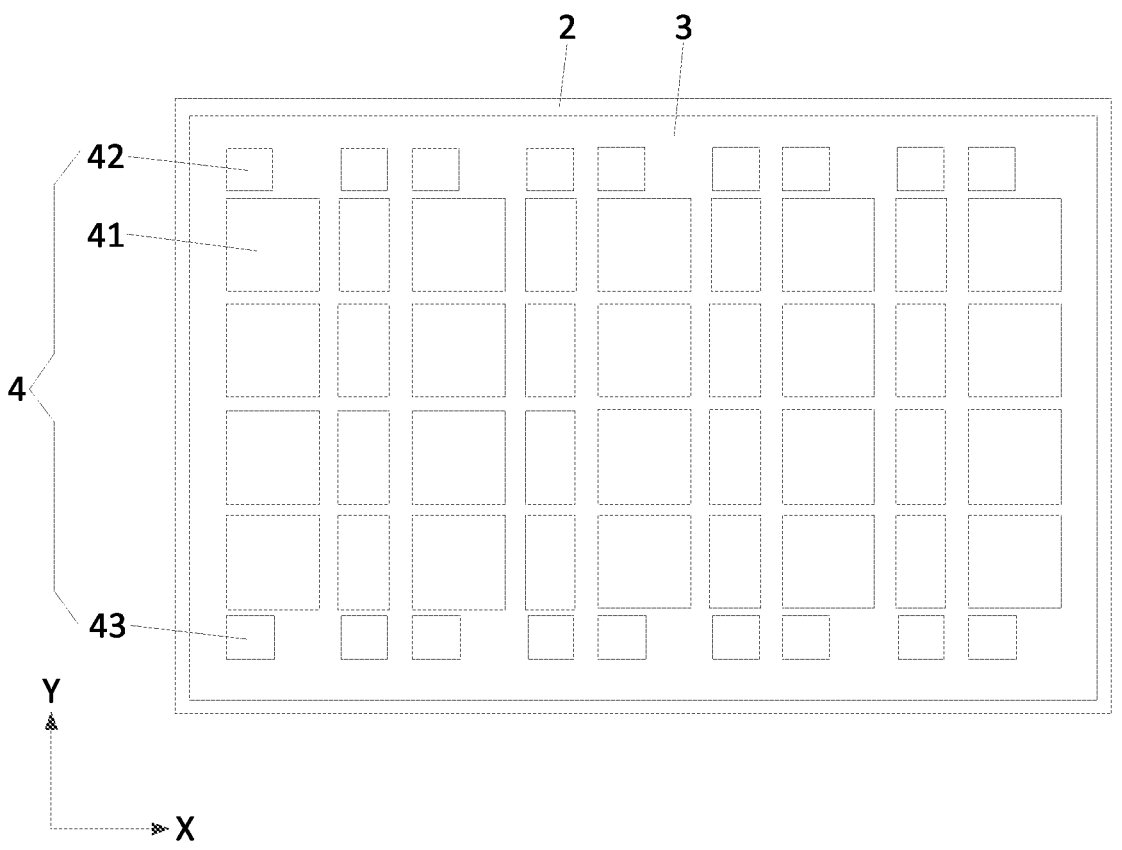
FIG. 5B is a planar structural diagram based on FIG. 5A.
Figure 5C:
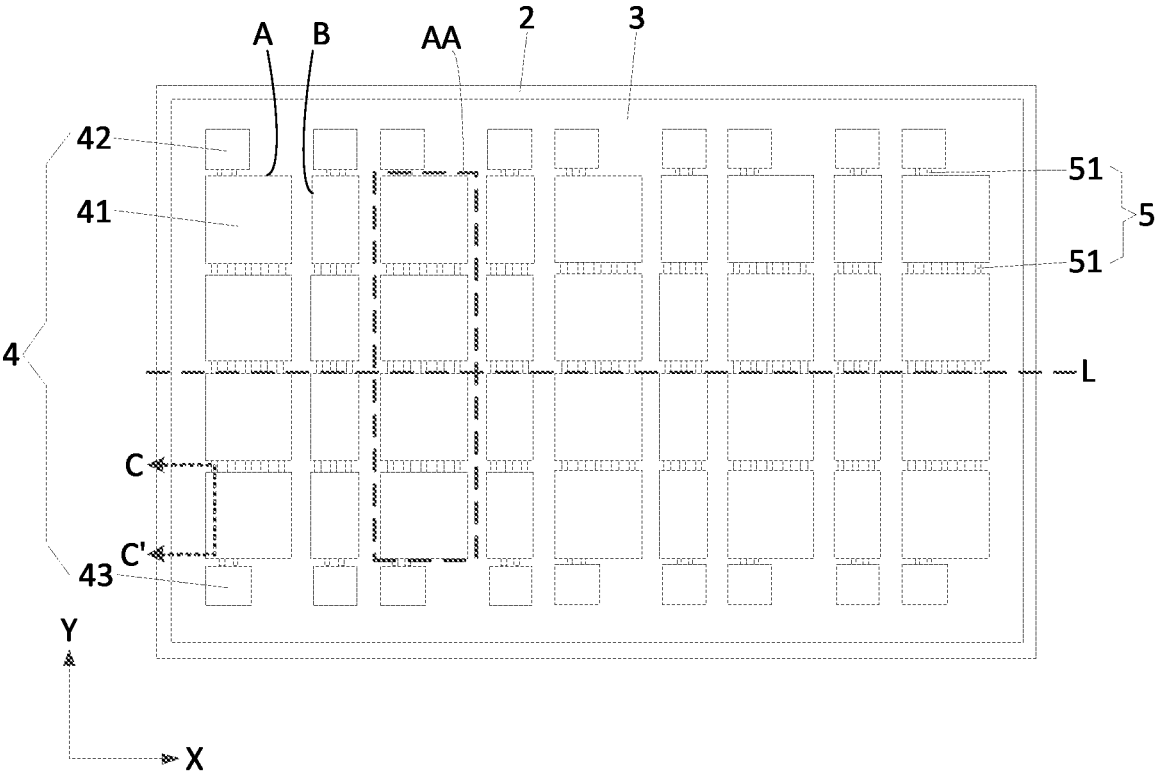
FIG. 5C is a planar structural diagram based on FIG. 5B.
Figure 6A:
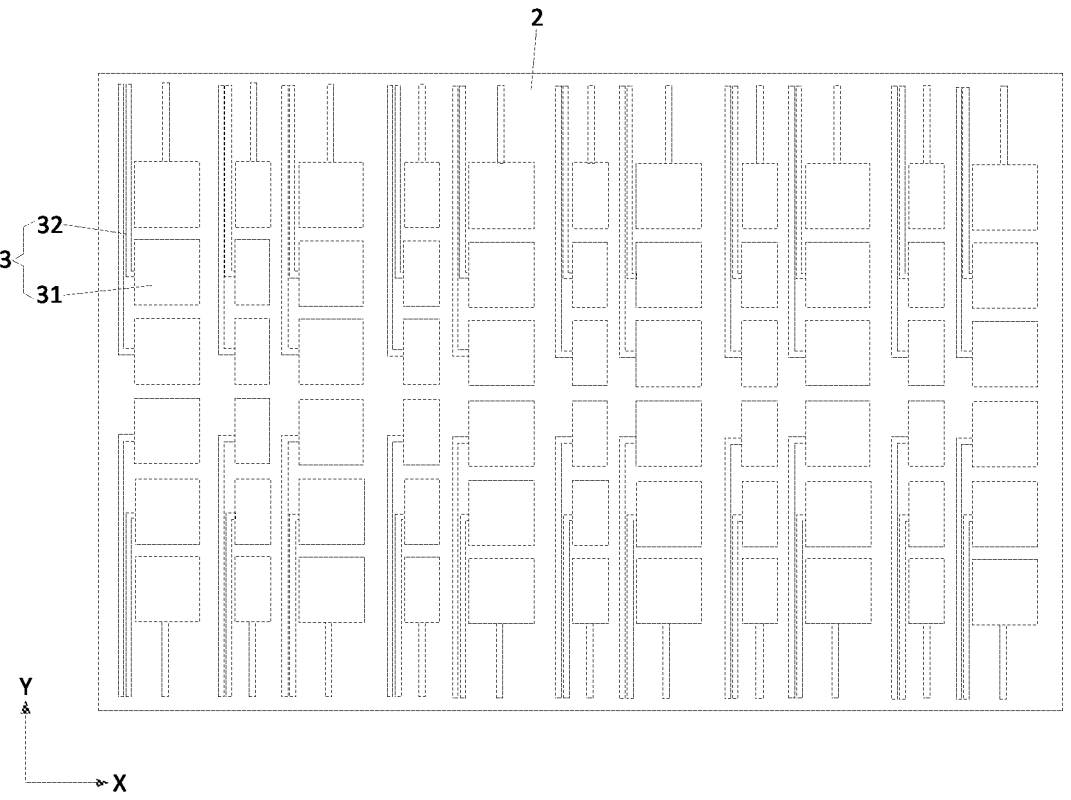
FIG. 6A is a planar structural diagram of yet another haptic feedback substrate according to an embodiment of the present disclosure.
Figure 6B:
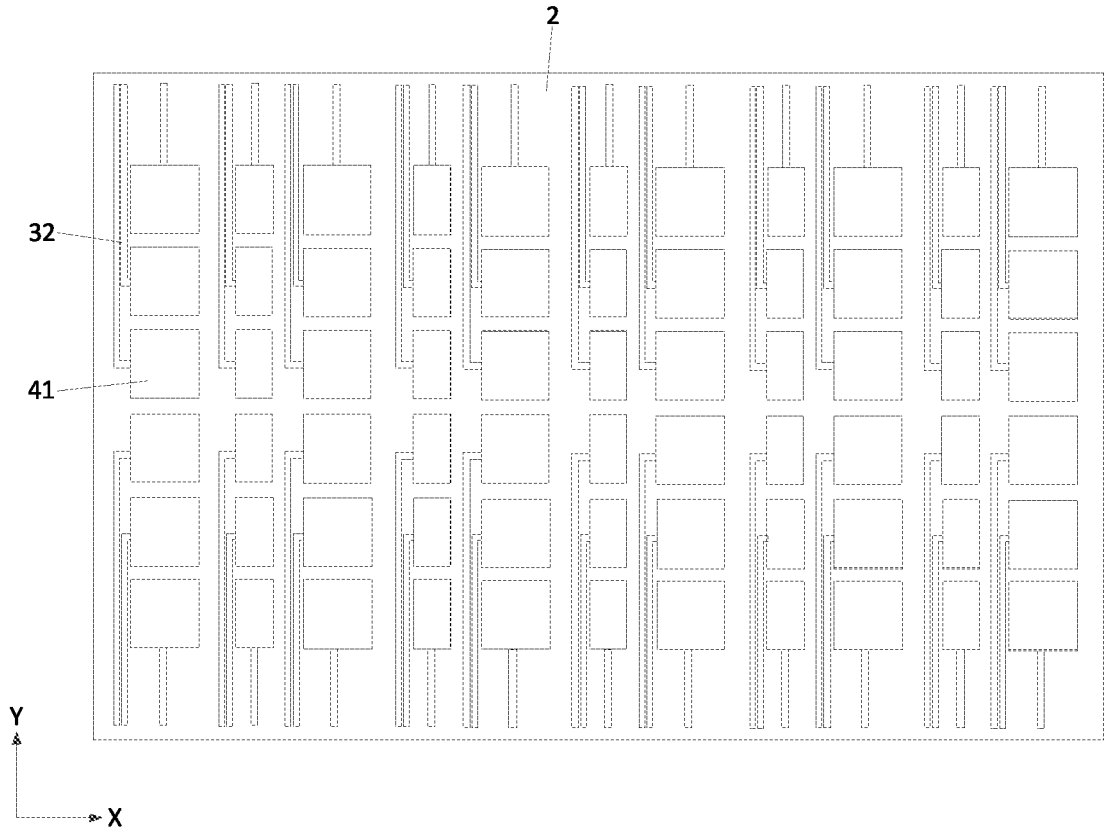
FIG. 6B is a planar structural diagram based on FIG. 6A.
Figure 6C:
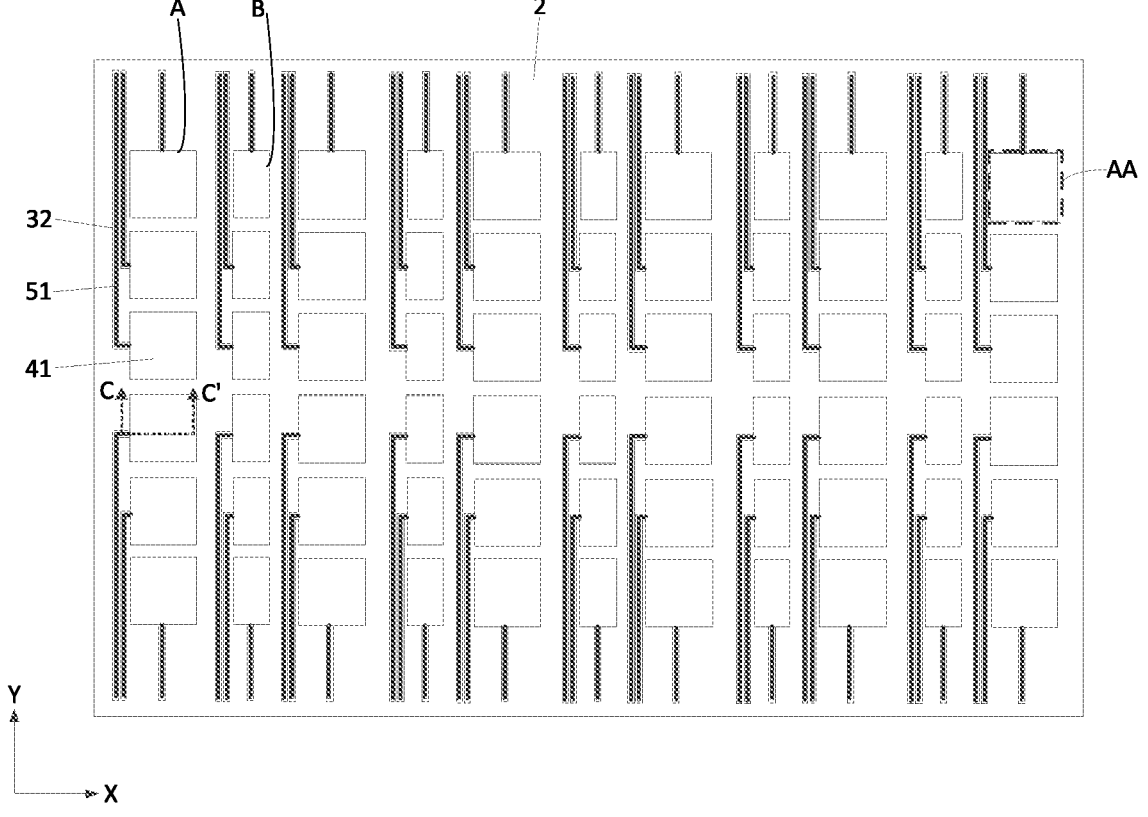
FIG. 6C is a planar structural diagram based on FIG. 6B.
Figure 7A:
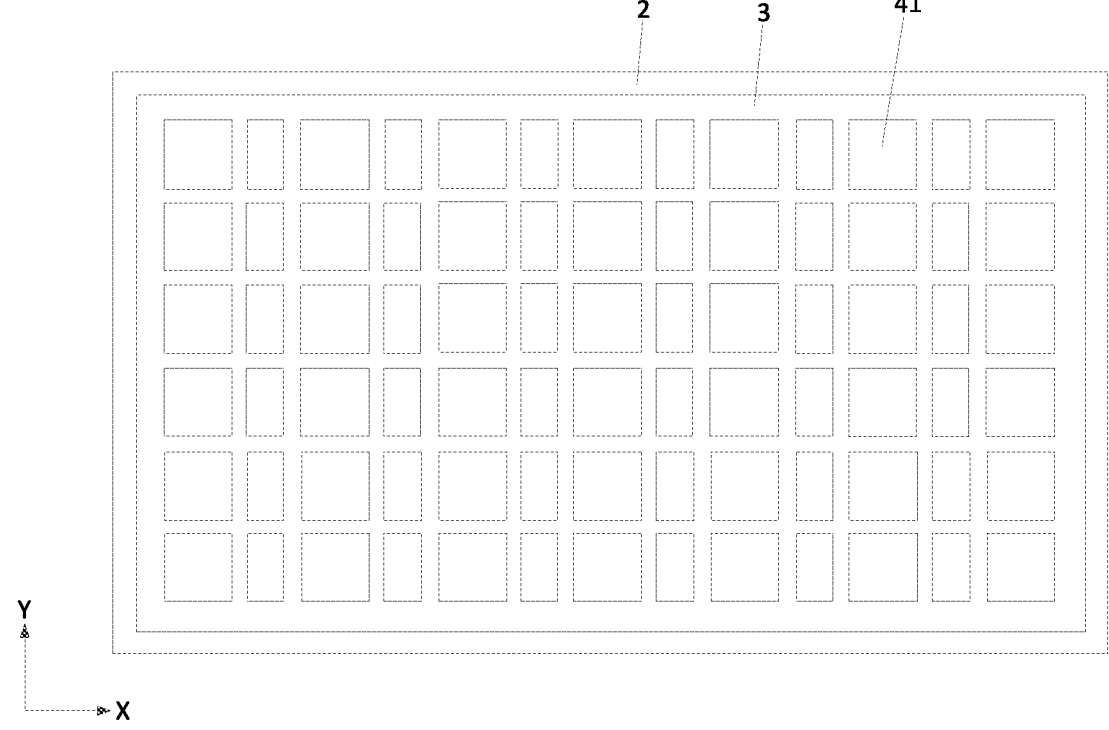
FIG. 7A is a planar structural diagram of yet another haptic feedback substrate according to an embodiment of the present disclosure.
Figure 7B:
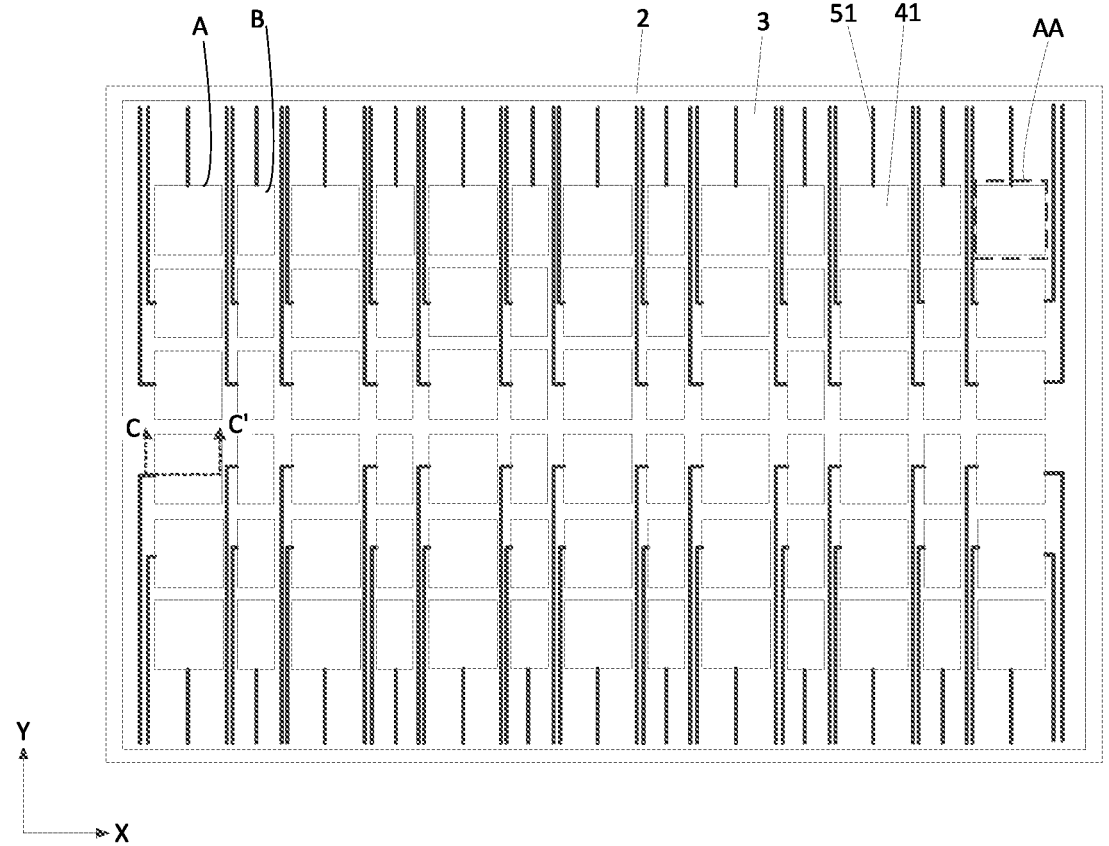
FIG. 7B is a planar structural diagram based on FIG. 7A.
Figure 8A:
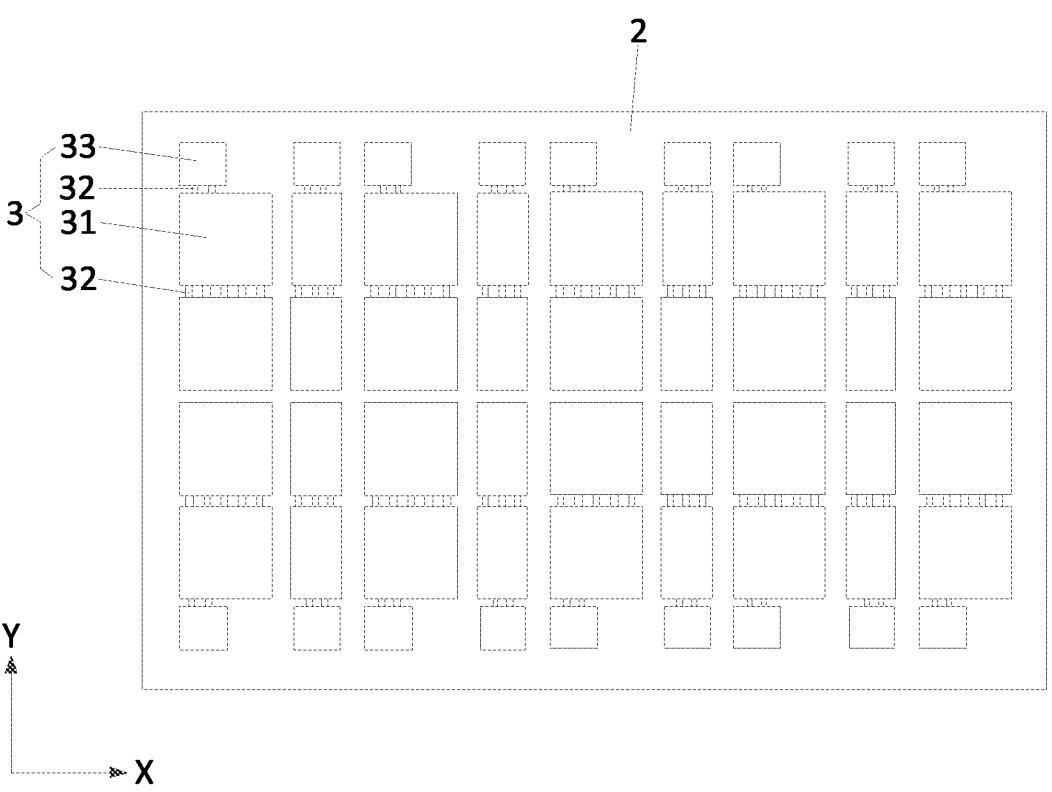
FIG. 8A is a planar structural diagram of yet another haptic feedback substrate according to an embodiment of the present disclosure.
Figure 8B:
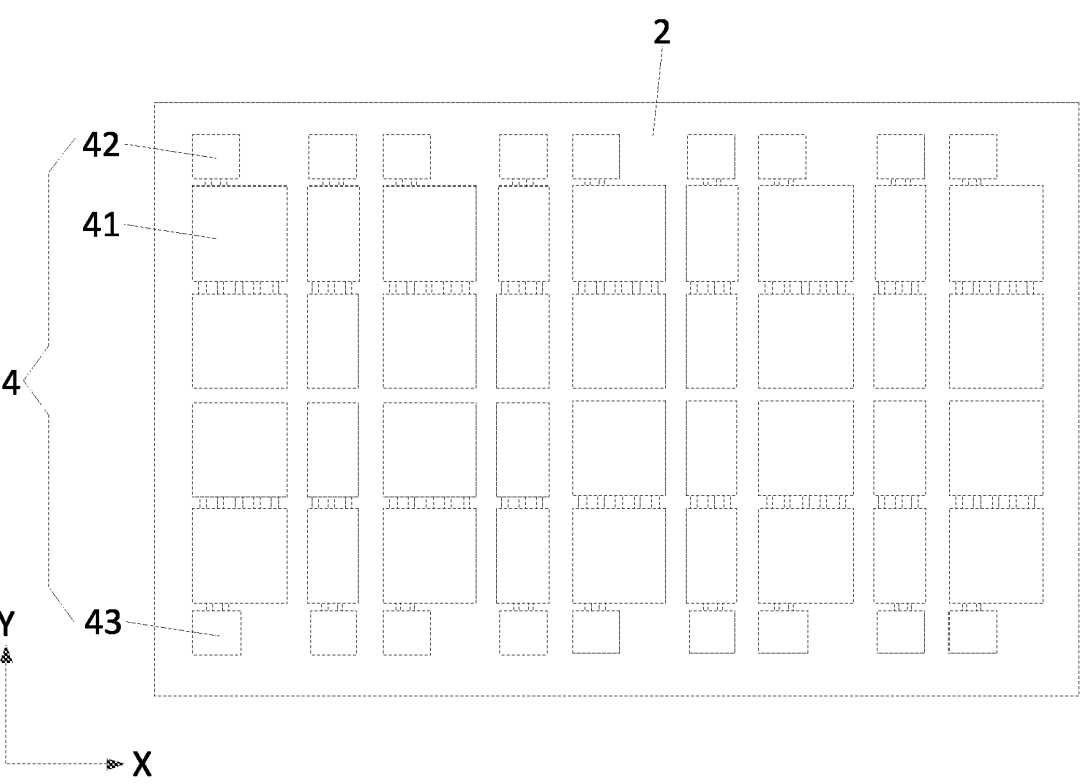
FIG. 8B is a planar structural diagram based on FIG. 8A.
Figure 8C:
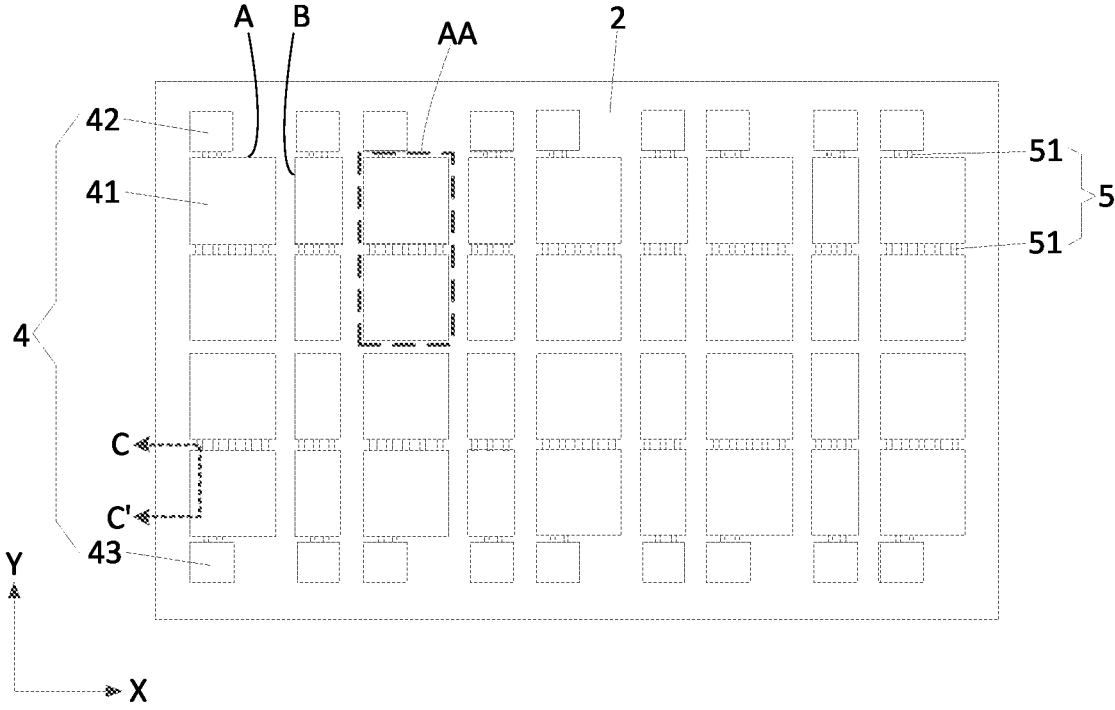
FIG. 8C is a planar structural diagram based on FIG. 8B.
Figure 9A:
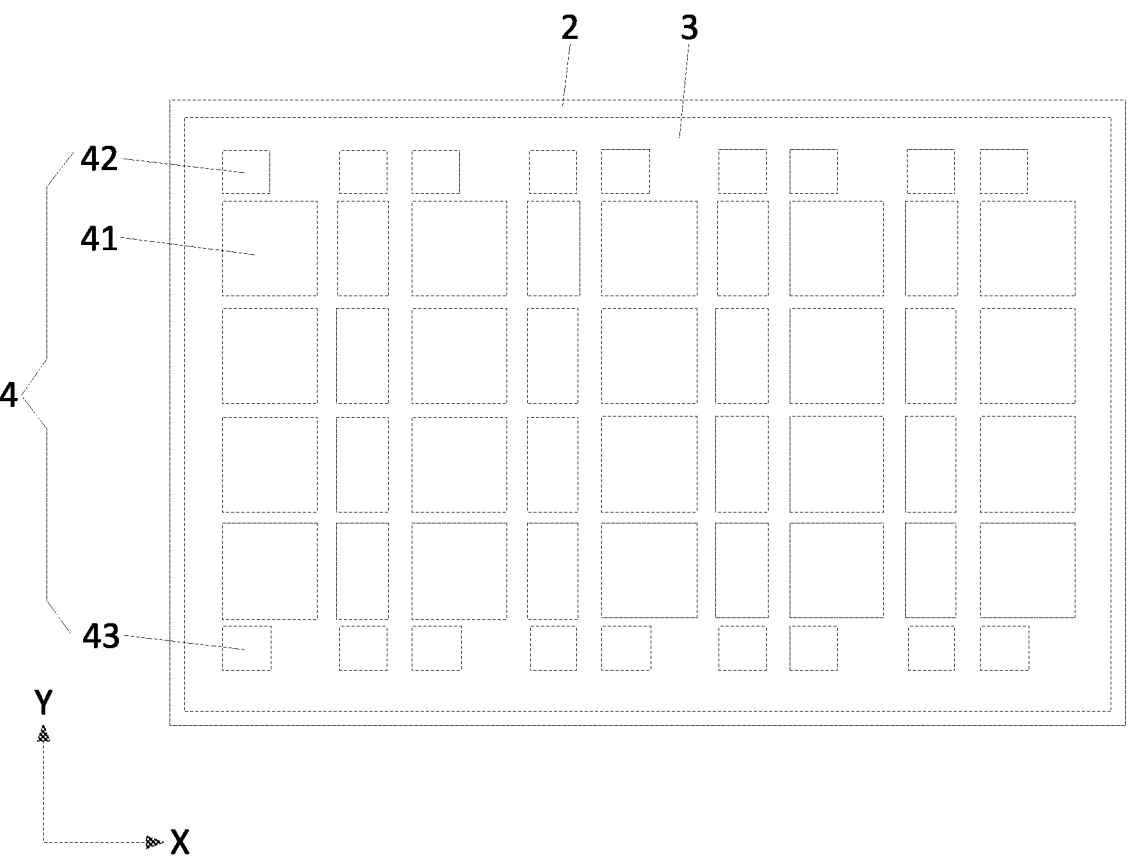
FIG. 9A is a planar structural diagram of yet another haptic feedback substrate according to an embodiment of the present disclosure.
Figure 9B:
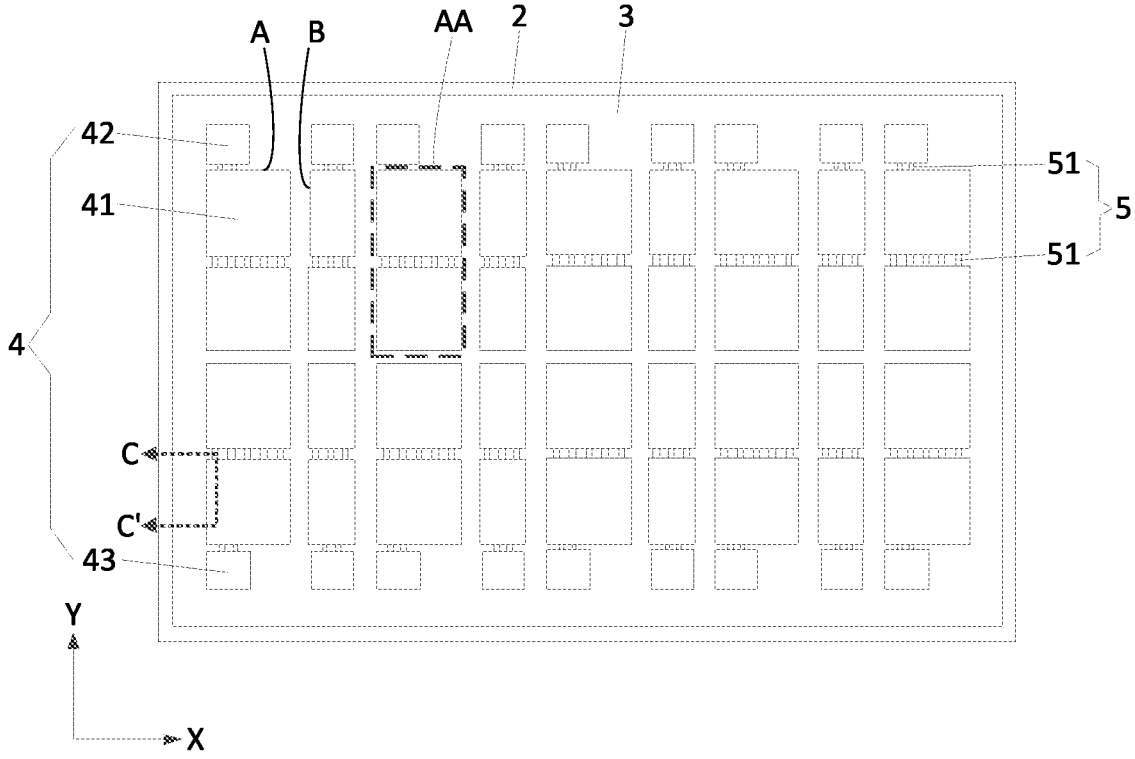
FIG. 9B is a planar structural diagram based on FIG. 9A.

In view of this, in the haptic feedback substrate provided in embodiments of the present disclosure, as shown in FIGS. 4A-4C, 5A-5C, 6A-6C, 7A-7B, 8A-8C, and 9A-9B, FIG. 4A shows a first electrode layer 2 and a piezoelectric film layer 3 on a base substrate, FIG. 4B shows a second electrode layer 4 based on FIG. 4A, FIG. 4C shows a wiring layer 5 based on FIG. 4B, FIG. 5A shows a first electrode layer 2 and a piezoelectric film layer 3 on a base substrate, FIG. 5B shows a second electrode layer 4 based on FIG. 5A, FIG. 5C shows a wiring layer 5 based on FIG. 5B, FIG. 6A shows a first electrode layer 2 and a piezoelectric film layer 3 on a base substrate, FIG. 6B shows a second electrode layer 4 based on FIG. 6A, FIG. 6C shows a wiring layer 5 based on FIG. 6B, FIG. 7A shows a first electrode layer 2, a piezoelectric film layer 3 and a second electrode layer 4 on a base substrate, FIG. 7B shows a wiring layer 5 based on FIG. 7A, FIG. 8A shows a first electrode layer 2 and a piezoelectric film layer 3 on a base substrate, FIG. 8B shows a second electrode layer 4 based on FIG. 8A, FIG. 9A shows a first electrode layer 2, a piezoelectric film layer 3 and a second electrode layer 4 on a base substrate, and FIG. 9B shows a wiring layer 5 based on FIG. 9A. The piezoelectric film layer 3 includes piezoelectric connectors 32, and orthographic projections of the wires 51 on the base substrate 1 are located within the range of orthographic projections of the piezoelectric connectors 32 on the base substrate 1. In this way, piezoelectric film materials are arranged under both the second electrode layer 4 and the wiring layer 5 so as to serve as insulating layers, and no other insulating layers are arranged, such that a climbing problem of the wiring layer 5 on the insulating layer having a large gradient angle as in the related art may be avoided, and further a risk of fracture of the wiring layer 5 may be avoided. In addition, the piezoelectric connectors 32 may be used as insulating materials, such that the piezoelectric connectors 32 may isolate the wiring layer 5 from the first electrode layer 2 so as to avoid short circuit. Therefore, in the embodiments shown in FIGS. 4C, 5C, 6C, 7B, 8C and 9B, no insulating layer is required to be manufactured, such that a thickness of the haptic feedback substrate may be reduced.

It should be noted that all the dotted boxes on the piezoelectric film layer 3 in FIG. 5C represent a circled piezoelectric part 31, a circled piezoelectric connector 32 and a circled piezoelectric buffer part 33 (which will be described later).

During specific implementation, in the haptic feedback substrate provided in the embodiment of the present disclosure, as shown in FIGS. 4A-4C, 6A-6C and 8A-8C, the piezoelectric film layer 3 further includes a plurality of piezoelectric parts 31 distributed in an array, and orthographic projections of the piezoelectric parts 31 on the base substrate 1 overlap orthographic projections of the second electrodes 41 on the base substrate 1; and the piezoelectric parts 31 are connected to the piezoelectric connectors 32, and the piezoelectric connector 32 is arranged between the adjacent piezoelectric parts 31. In this way, the piezoelectric connector 32 is arranged below each wire 51, such that no fracture of each wire 51 may occur.

In some embodiments, the piezoelectric connector 32 and the piezoelectric part 31 may be integrally formed, and patterns of the piezoelectric connector 32 and the piezoelectric part 31 may be formed through a one-off patterning process only by changing an original pattern when the piezoelectric part 31 is formed, and no process for manufacturing the piezoelectric connector 32 separately is required to be added, such that a manufacturing process may be simplified, production cost may be saved, and production efficiency may be improved.

During specific implementation, in the haptic feedback substrate provided in the embodiment of the present disclosure, as shown in FIGS. 4A-4C, 6A-6C and 8A-8C, the orthographic projections of the piezoelectric connectors 32 on the base substrate 1 may be in one-to-one correspondence to the orthographic projections of the wires 51 on the base substrate 1. In this way, a piezoelectric film material is arranged below each wire 51, such that no fracture of each wire 51 may occur.

During specific implementation, in the haptic feedback substrate provided in the embodiment of the present disclosure, as shown in 5A-5C, 7A-7B and 9A-9B, the piezoelectric film layer 3 further includes a plurality of piezoelectric parts 31 distributed in an array, and the plurality of piezoelectric parts 31 and the connectors 32 are of an integrally formed entire-surface structure. In this way, the wires 51 are directly manufactured on the piezoelectric film layer 3, such that the climbing problem of the wiring layer 5 on the insulating layer having a large gradient angle as in the related art may also be avoided, and further the risk of fracture of the wiring layer 5 may be avoided In addition, while satisfying device properties, the entire-surface structure may reduce a process flow of etching the piezoelectric film layer 3 in one step and simplify a manufacturing process.

During specific implementation, in the haptic feedback substrate provided in the embodiment of the present disclosure, as shown in FIGS. 4C and 5C, each vibration zone AA includes a plurality of second electrodes 41, the plurality of second electrodes 41 constitute one column, and the two adjacent second electrodes 41 in the same column are electrically connected through the wires 51. In this way, the haptic feedback substrate shown in FIGS. 4C and 5C provided in the embodiment of the present disclosure may drive piezoelectric devices through column drive. In some embodiments, piezoelectric devices at positions of wave peaks and wave troughs may be simultaneously excited, alternatively, piezoelectric devices at positions of wave peaks or wave troughs may be excited separately, and alternatively, some columns of piezoelectric devices in all piezoelectric devices may be excited separately to achieve zoned excitation, such that power consumption of a device may be reduced.

During specific implementation, in the haptic feedback substrate provided in the embodiment of the present disclosure, as shown in FIGS. 4C and 5C, the two adjacent second electrodes 41 in the same column may be electrically connected through a plurality of independent wires 51 arranged in a row direction X. In some embodiments, the plurality of independent wires 51 have a relatively small width. When one or more piezoelectric devices in the same column are short-circuited, the wires 51 between the two adjacent second electrodes 41 in the same column may be cut off, and the second electrodes 41 of the piezoelectric devices at short-circuit positions may be isolated, such that short-circuit points may be prevented from influencing the other piezoelectric devices, and further normal operation of the other piezoelectric devices cannot be influenced.

During specific implementation, in the haptic feedback substrate provided in embodiments of the present disclosure, as shown in FIGS. 4C and 5C, orthographic projections of the plurality of independent wires 51 arranged in the row direction X on the base substrate 1 are located between orthographic projections of the two adjacent second electrodes 41 on the base substrate 1. That is, an orthographic projection of the piezoelectric connector 32 on the base substrate 1 is located between orthographic projections of the two adjacent piezoelectric parts 31 on the base substrate 1 in the embodiments of FIGS. 4C and 5C of the present disclosure. Certainly, the piezoelectric connector 32 may also be connected after led out from one side of the two adjacent piezoelectric parts 31.

During specific implementation, in the haptic feedback substrate provided in the embodiment of the present disclosure, as shown in FIGS. 4A-4C, when the piezoelectric film layer 3 includes the plurality of piezoelectric parts 31 distributed in an array, the piezoelectric film layer 3 further includes piezoelectric buffer parts 33 at one end of a first piezoelectric part 31 and one end of a last piezoelectric part 31 in the same column of piezoelectric parts 31, and the piezoelectric buffer parts 33 are connected to the piezoelectric parts 31 through a plurality of independent piezoelectric connectors 32 arranged in the row direction X;

the haptic feedback substrate further includes first binding parts 42 and second binding parts 43 arranged on the same layer as the second electrodes 41, and the first binding parts 42 and the second binding parts 43 are located on the corresponding piezoelectric buffer parts 33, respectively; and the first binding parts 42 are electrically connected to the second electrodes 41 through a plurality of independent wires 51 arranged in the row direction X, the second binding parts 43 are electrically connected to the second electrodes 41 through a plurality of independent wires 51 arranged in the row direction X, and the first binding parts 42 and/or the second binding parts 43 are electrically connected to the drive voltage input ends.

During specific implementation, in the haptic feedback substrate provided in embodiments of the present disclosure, as shown in FIGS. 5A-5C, when the piezoelectric film layer 3 is of an entire-surface structure, the haptic feedback substrate further includes first binding parts 42 and second binding parts 43 arranged on the same layer as the second electrodes 41, and the first binding parts 42 and the second binding parts 43 are located on the piezoelectric film layer 3 separately; and the first binding parts 42 are electrically connected to the second electrodes 41 through a plurality of independent wires 51 arranged in the row direction X, the second binding parts 43 are electrically connected to the second electrodes 41 through a plurality of independent wires 51 arranged in the row direction X, and the first binding parts 42 and/or the second binding parts 43 are electrically connected to the drive voltage input ends.

In some embodiments of the present disclosure, preferably, both the first binding part 42 and the second binding part 43 are electrically connected to a drive voltage end, such that when a short-circuited piezoelectric device in a certain column is cut, the remaining piezoelectric devices in the column may be driven through the first binding part 42 and/or the second binding part 43, and normal operation of the remaining piezoelectric devices may be ensured.

During specific implementation, in the haptic feedback substrate provided in embodiments of the present disclosure, as shown in FIGS. 4C and 5C, the first binding part 42 and the second binding part 43 that are electrically connected to each column of second electrodes 41 are symmetrically arranged with respect to a center line L of the base substrate 1 in the row direction. In this way, a film layer on the whole base substrate 1 may be uniformly arranged, and further a haptic feedback effect of the base substrate 1 may be improved.

In some embodiments, as shown in FIGS. 4A-4C, the piezoelectric part 31, the piezoelectric buffer part 33 and the piezoelectric connector 32 are integrally formed, such that patterns of the piezoelectric buffer part 33, the piezoelectric connector 32 and the piezoelectric part 31 may be formed through a one-off patterning process only by changing an original pattern when the piezoelectric part 31 is formed, and no process for manufacturing the piezoelectric buffer part 33 and the piezoelectric connector 32 separately is required to be added, a manufacturing process may be simplified, production cost may be saved, and production efficiency may be improved.

In some embodiments, as shown in FIGS. 4A-4C, the piezoelectric buffer parts 33 may have a smaller size than the piezoelectric parts 31, which is not limited herein.

In some embodiments, as shown in FIG. 4C, the number of wires 51 between the first binding part 42 and the second electrode 41 is smaller than the number of wires 51 between the adjacent second electrodes 41, and the number of wires 51 between the second binding part 43 and the second electrode 41 is smaller than the number of wires 51 between the adjacent second electrodes 41.

Therefore, the haptic feedback substrate shown in FIGS. 4C and 5C provided in the embodiment of the present disclosure may drive piezoelectric devices through column drive. In some embodiments, piezoelectric devices at positions of wave peaks and wave troughs may be simultaneously excited, alternatively, piezoelectric devices at positions of wave peaks or wave troughs may be excited separately, and alternatively, some columns of piezoelectric devices in all piezoelectric devices may be excited separately to achieve zoned excitation, such that power consumption of a device may be reduced. Moreover, piezoelectric film materials are arranged under both the second electrode layer 4 and the wiring layer 5 so as to serve as insulating layers, and no other insulating layers are arranged, such that the climbing problem of the wiring layer on the insulating layer having a large gradient angle as in the related art may be avoided, and further the risk of fracture of the wiring layer 5 may be avoided. In addition, the piezoelectric film materials may be used as insulating materials, such that the piezoelectric film materials may isolate the wiring layer 5 from the first electrode layer 2 so as to avoid short circuit. Therefore, in the embodiments shown in FIGS. 4C and 5C, no insulating layer is required to be manufactured, such that a thickness of the haptic feedback substrate may be reduced. In addition, in the structure shown in FIG. 5C, the piezoelectric film layer is of an entire-surface structure, such that the manufacturing process may be simplified.

During specific implementation, in the haptic feedback substrate provided in embodiments of the present disclosure, as shown in FIGS. 6C and 7B, each vibration zone AA includes one second electrode 41, and each second electrode 41 is electrically connected to different wires 51, such that when the device works, second electrodes 41 at positions of wave peaks and wave troughs may be simultaneously excited, alternatively, second electrodes 41 at positions of wave peaks or wave troughs may be excited separately, and alternatively, some columns of second electrodes 41 in all second electrodes may be excited separately to achieve zoned excitation, and further power consumption of the device may be reduced.

In some embodiments, the piezoelectric film layers 3 in FIGS. 6A-6C are of a patterned structure, and the piezoelectric film layers 3 in FIGS. 7A-7B are of an entire-surface structure, in which the piezoelectric film layers 3 are deposited on an entire surface.

During specific implementation, in the haptic feedback substrate provided in embodiments of the present disclosure, as shown in FIGS. 6A-6C and 7A-7B, all the second electrodes 41 are distributed in an array, all the wires 51 electrically connected to a first row of second electrodes 41 and a last row of second electrodes 41 are directly led out from ends of the second electrodes 41, and all the wires 51 electrically connected to the other rows (except the first row and the last row) of second electrodes 41 are led out from gaps between two adjacent columns of second electrodes 41. In this way, the wires 51 on the base substrate 1 may be uniformly distributed, and uniformity of signal transmission may be improved. In some embodiments, the orthographic projections of the wires 51 are located within and are in one-to-one correspondence to the orthographic projections of the piezoelectric connectors 32, such that a pattern of the piezoelectric connectors 32 is consistent with that of the wires 51. In this way, when the piezoelectric film layer 3 is manufactured, the pattern of the piezoelectric film layer 3 in FIG. 6A may be manufactured, and alternatively, the entire-surface structure shown in FIG. 7A may be manufactured directly.

During specific implementation, in the haptic feedback substrate provided in embodiments of the present disclosure, as shown in FIGS. 6C and 7B, in the other rows (except the first row and the last row) of second electrodes 41, the wires 51 electrically connected to some rows (a second row and a third row) of second electrodes 41 are led out to one side of the first row of second electrodes 41, and the wires 51 electrically connected to the other rows (a fourth row and a fifth row) of second electrodes 41 are led out to one side of the last row of second electrodes 41. In this way, the wires 51 on the base substrate 1 may further be uniformly distributed.

Therefore, according to the haptic feedback substrate shown in FIGS. 6C and 7B provided in the embodiment of the present disclosure, when the device works, the second electrodes 41 at the positions of the wave peaks and the wave troughs may be simultaneously excited, alternatively, the second electrodes 41 at the positions of the wave peaks or the wave troughs may be excited separately, and alternatively, some columns of second electrodes 41 in all second electrodes may be excited separately to achieve zoned excitation, and further power consumption of the device may be reduced. Moreover, in FIGS. 6C and 7B, piezoelectric film materials are arranged under both the second electrode layer 4 and the wiring layer 5 so as to serve as insulating layers, and no other insulating layers are arranged, such that the climbing problem of the wiring layer on the insulating layer having a large gradient angle as in the related art may be avoided, and further the risk of fracture of the wiring layer 5 may be avoided. In addition, in FIGS. 6C and 7B, the piezoelectric film materials may be used as insulating materials, such that the piezoelectric film materials may isolate the wiring layer 5 from the first electrode layer 2 so as to avoid short circuit. Therefore, in the embodiments shown in FIGS. 6C and 7B, no insulating layer is required to be manufactured, such that the thickness of the haptic feedback substrate may be reduced. In addition, in the structure shown in FIG. 7B, the piezoelectric film layer is of an entire-surface structure, such that the manufacturing process may be simplified.

During specific implementation, in the haptic feedback substrate provided in embodiments of the present disclosure, as shown in FIGS. 8C and 9B, each vibration zone AA includes at least two second electrodes 41 in the same column (for example, the same column includes two vibration zones AA and each vibration zone AA includes two second electrodes 41), all the vibration zones AA in the same column are independent of each other, and the two adjacent second electrodes 41 in each vibration zone AA are electrically connected through the wires 51. In this way, the haptic feedback substrate shown in FIGS. 8C and 9B provided in the embodiment of the present disclosure may drive piezoelectric devices in a zoned manner. In some embodiments, piezoelectric devices at part of positions of wave peaks and part of positions of wave troughs in one column may be simultaneously excited, alternatively, piezoelectric devices at part of positions of wave peaks or part of positions of wave troughs in one column may be excited separately, and alternatively, part of piezoelectric devices in some columns of piezoelectric devices in all piezoelectric devices may be excited separately to achieve zoned excitation, such that power consumption of the device may be reduced.

During specific implementation, in the haptic feedback substrate provided in embodiments of the present disclosure, as shown in FIGS. 8C and 9B, the two adjacent second electrodes 41 in each vibration zone AA may be electrically connected through a plurality of independent wires 51 arranged in the row direction X. In some embodiments, the plurality of independent wires 51 have a relatively small width. When one or more piezoelectric devices in the same column are short-circuited, the wires 51 between the two adjacent second electrodes 41 in the same column may be cut off, and the second electrodes 41 of the piezoelectric devices at short-circuit positions may be isolated, such that short-circuit points may be prevented from influencing the other piezoelectric devices, and further normal operation of the other piezoelectric devices cannot be influenced.

During specific implementation, in the haptic feedback substrate provided in embodiments of the present disclosure, as shown in FIGS. 8C and 9B, orthographic projections of the plurality of independent wires 51 arranged in the row direction X on the base substrate 1 are located between orthographic projections of the two adjacent second electrodes 41 on the base substrate 1. That is, an orthographic projection of the piezoelectric connector 32 on the base substrate 1 is located between orthographic projections of the two adjacent piezoelectric parts 31 on the base substrate 1 in embodiments of FIGS. 8C and 9B of the present disclosure. Certainly, the piezoelectric connector 32 may also be connected after led out from one side of the two adjacent piezoelectric parts 31.

During specific implementation, in the haptic feedback substrate provided in embodiments of the present disclosure, as shown in FIGS. 8C and 9B, the same column includes two vibration zones AA, and the second electrodes in the two vibration zones AA in the same column each are the same in number, which are not limited herein. For example, the same column may further include three, four, or more vibration zones AA, and the second electrodes in a plurality of vibration zones AA in the same column each are the same in number.

During specific implementation, in the haptic feedback substrate provided in embodiments of the present disclosure, as shown in FIG. 8C, when the piezoelectric film layer 3 includes the plurality of piezoelectric parts 31 distributed in an array, the piezoelectric film layer 3 further includes piezoelectric buffer parts 33 at one end of a first piezoelectric part 31 and one end of a last piezoelectric part 31 in the same column of piezoelectric parts 31, and the piezoelectric buffer parts 33 are connected to the piezoelectric parts 31 through a plurality of independent piezoelectric connectors 32 arranged in the row direction X; the haptic feedback substrate further includes first binding parts 42 and second binding parts 43 arranged on the same layer as the second electrodes 41, and the first binding parts 42 and the second binding parts 43 are located on the corresponding piezoelectric buffer parts 33, respectively; and second electrodes 41 in one vibration zone AA in the two vibration zones AA in the same column are electrically connected to the first binding part 42 through a plurality of independent wires 51 arranged in the row direction X, second electrodes 41 in the other vibration zone AA in the two vibration zones AA in the same column are electrically connected to the second binding part 43 through a plurality of independent wires 51 arranged in the row direction X, and the first binding parts 42 and the second binding parts 43 are electrically connected to the corresponding drive voltage input ends.

During specific implementation, in the haptic feedback substrate provided in embodiments of the present disclosure, as shown in FIG. 9B, when the piezoelectric film layer 3 is of an entire-surface structure, the haptic feedback substrate further includes first binding parts 42 and second binding parts 43 arranged on the same layer as the second electrodes 41, and the first binding parts 42 and the second binding parts 43 are located on the piezoelectric film layer 3 separately; and second electrodes 41 in one vibration zone AA in vibration zones AA in the same column are electrically connected to the first binding part 42 through a plurality of independent wires 51 arranged in the row direction X, second electrodes 41 in the other vibration zone AA in the two vibration zones AA in the same column are electrically connected to the second binding part 43 through a plurality of independent wires 51 arranged in the row direction X, and the first binding parts 42 and the second binding parts 43 are electrically connected to the corresponding drive voltage input ends.

During specific implementation, in the haptic feedback substrate provided in embodiments of the present disclosure, as shown in FIGS. 8C and 9B, the first binding part 42 and the second binding part 43 corresponding to the two vibration zones AA in the same column are symmetrically arranged with respect to a center line L of the base substrate 1 in the row direction X. In this way, a film layer on the whole base substrate 1 may be uniformly arranged, and further a haptic feedback effect of the base substrate 1 may be improved.

In some embodiments, as shown in FIGS. 8A-8C, the piezoelectric part 31, the piezoelectric buffer part 33 and the piezoelectric connector 32 are integrally formed, such that patterns of the piezoelectric buffer part 33, the piezoelectric connector 32 and the piezoelectric part 31 may be formed through a one-off patterning process only by changing an original pattern when the piezoelectric part 31 is formed, and no process for manufacturing the piezoelectric buffer part 33 and the piezoelectric connector 32 separately is required to be added, a manufacturing process may be simplified, production cost may be saved, and production efficiency may be improved.

In some embodiments, as shown in FIGS. 8A-8C, the piezoelectric buffer parts 33 may have a smaller size than the piezoelectric parts 31, which is not limited herein.

In some embodiments, as shown in FIG. 8C, the number of wires 51 between the first binding part 42 and the second electrode 41 is smaller than the number of wires 51 between the adjacent second electrodes 41, and the number of wires 51 between the second binding part 43 and the second electrode 41 is smaller than the number of wires 51 between the adjacent second electrodes 41.

Therefore, the haptic feedback substrate shown in FIGS. 8C and 9B provided in embodiments of the present disclosure may drive piezoelectric devices in a zoned manner. In some embodiments, piezoelectric devices at part of positions of wave peaks and part of positions of wave troughs in one column may be simultaneously excited, alternatively, piezoelectric devices at part of positions of wave peaks or part of positions of wave troughs in one column may be excited separately, and alternatively, part of piezoelectric devices in some columns of piezoelectric devices in all piezoelectric devices may be excited separately to achieve zoned excitation, such that power consumption of the device may be reduced. Moreover, in FIGS. 8C and 9B, piezoelectric film materials are arranged under both the second electrode layer 4 and the wiring layer 5 so as to serve as insulating layers, and no other insulating layers are arranged, such that the climbing problem of the wiring layer on the insulating layer having a large gradient angle as in the related art may be avoided, and further the risk of fracture of the wiring layer 5 may be avoided. In addition, the piezoelectric film materials may be used as insulating materials, such that the piezoelectric film materials may isolate the wiring layer 5 from the first electrode layer 2 so as to avoid short circuit. Therefore, in the embodiments shown in FIGS. 8C and 9B, no insulating layer is required to be manufactured, such that the thickness of the haptic feedback substrate may be reduced. In addition, the piezoelectric film layer is of an entire-surface structure, such that the manufacturing process may be simplified.

It should be noted that the embodiment of the present disclosure takes using a high-frequency (1000 Hz or above) alternating current voltage signal to drive a piezoelectric device as an example. Certainly, the haptic feedback substrate provided in the embodiment of the present disclosure is also suitable for driving a piezoelectric device with a low-frequency (1000 Hz or below) alternating current voltage signal.

During specific implementation, as shown in FIGS. 4A-9B, in order to reduce the process flow while satisfying the device properties, the first electrode layer 2 may be of an entire-surface structure. At present, it becomes a development trend to integrate the haptic feedback substrate into a display device. In order not to influence a transmittance of the display device, the first electrode layer 2 may be made of transparent conductive materials having a high transmittance, such as ITO. Certainly, in devices in which a transmittance is not considered, the first electrode layer 2 may be made of metals having high conductivity such as Pb and Au.

However, when the first electrode layer 2 is made of a conductive material having relatively low conductivity, for example, ITO, arranging the first electrode layer 2 on an entire surface of a large-area base substrate may lead to voltage drop (IR drop).

During specific implementation, in the haptic feedback substrate provided in embodiments of the present disclosure, as shown in FIGS. 4A-9B, the first electrode layer 2 may be of an entire-surface structure, such that the process flow may be reduced while the device properties may be satisfied.

Figure 10A:
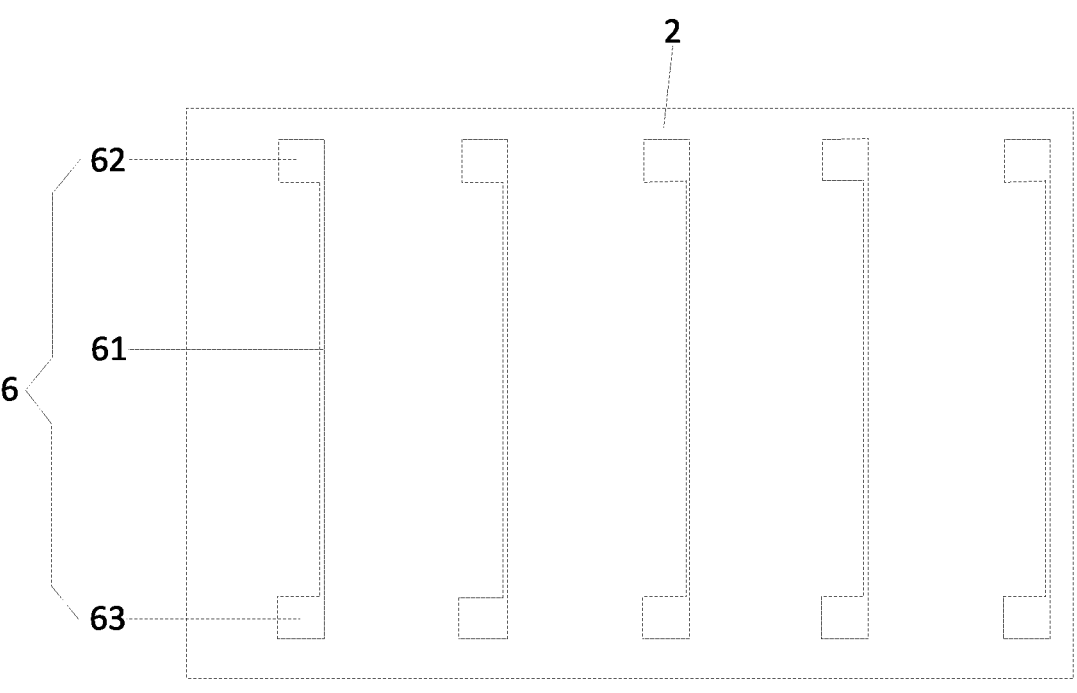
FIG. 10A is a planar structural diagram of yet another haptic feedback substrate according to an embodiment of the present disclosure.
Figure 10B:
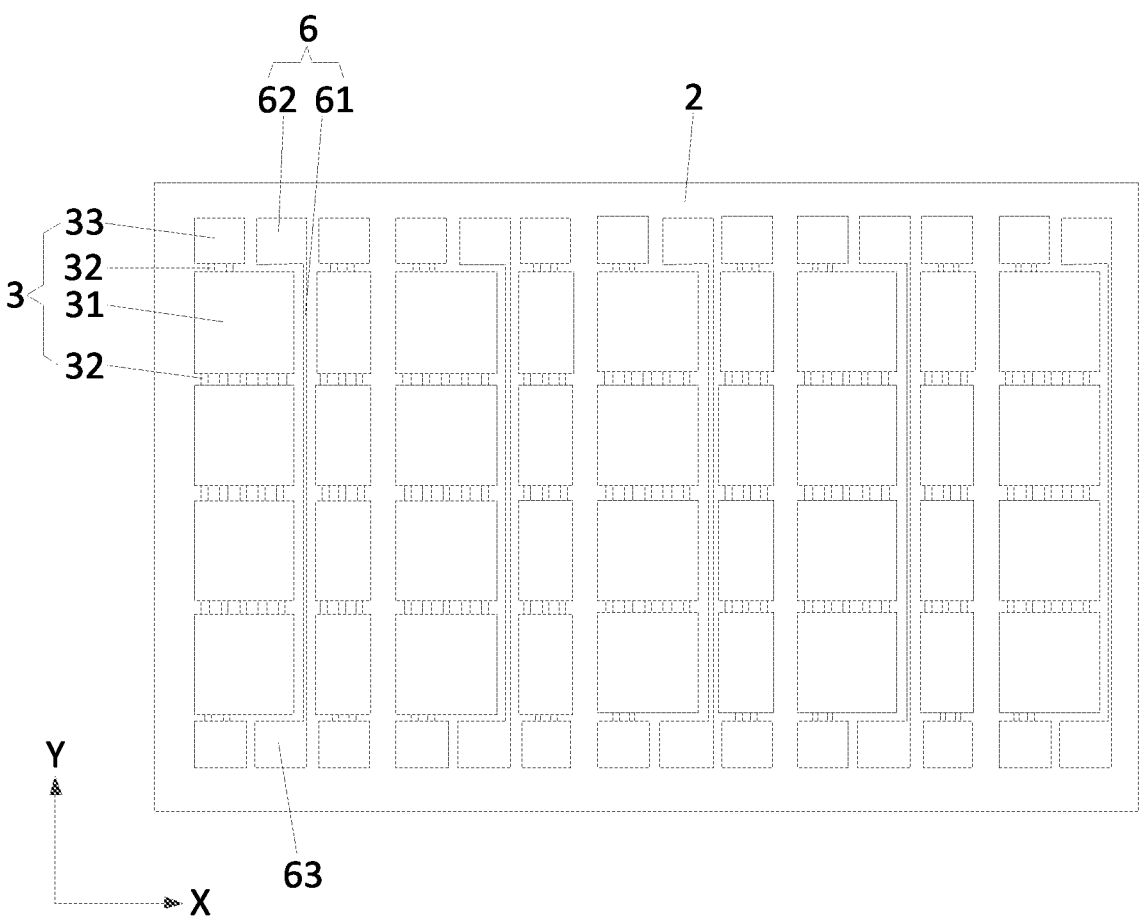
FIG. 10B is a planar structural diagram based on FIG. 10A.
Figure 10C:
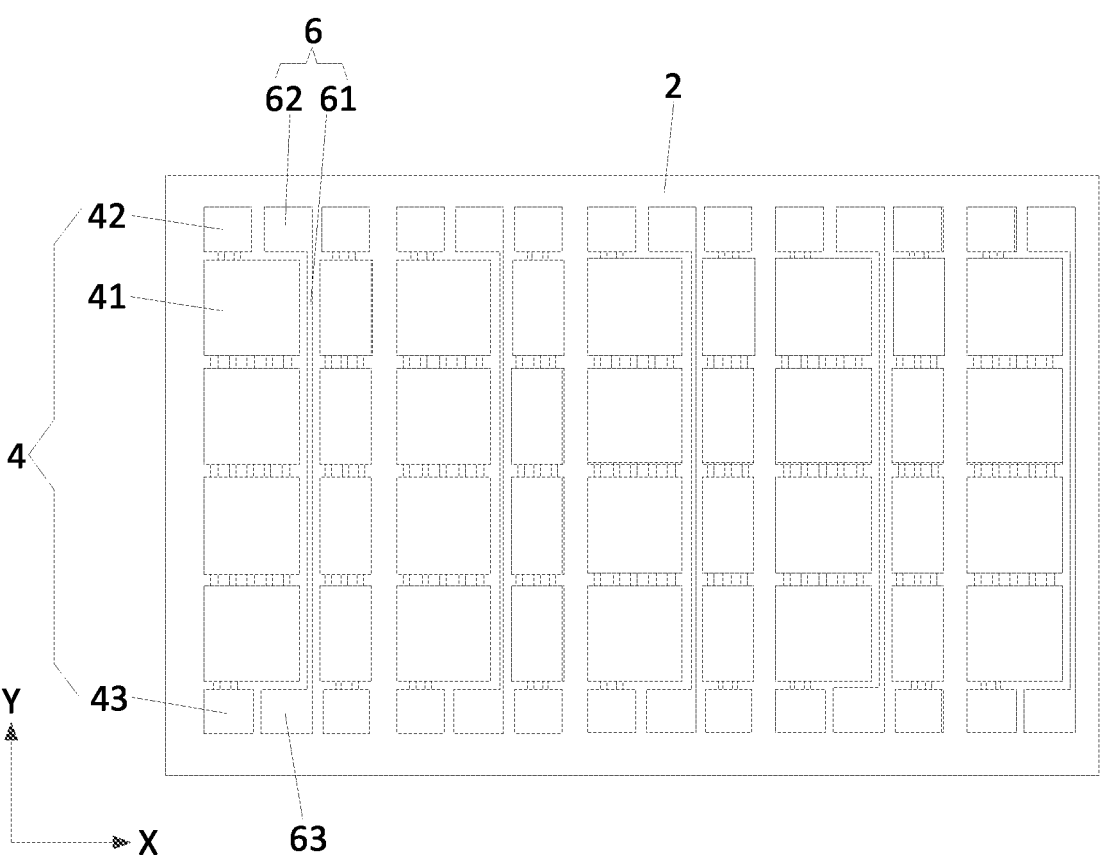
FIG. 10C is a planar structural diagram based on FIG. 10B.
Figure 10D:
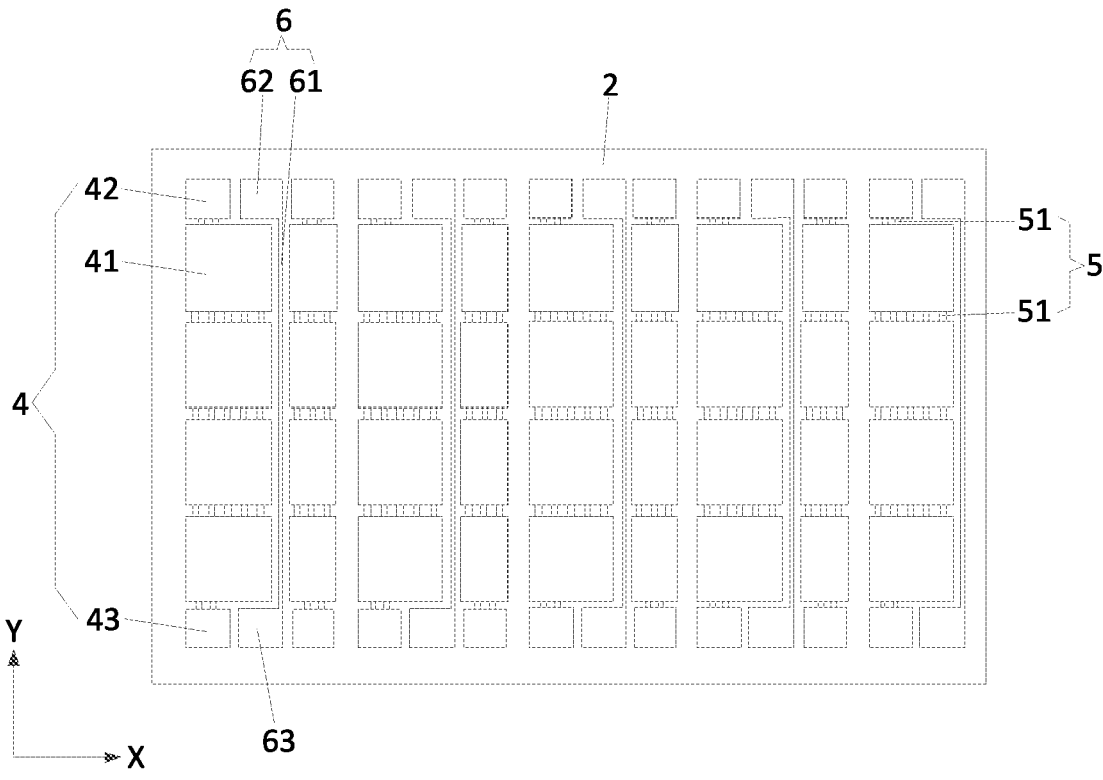
FIG. 10D is a planar structural diagram based on FIG. 10C.
Figure 11A:
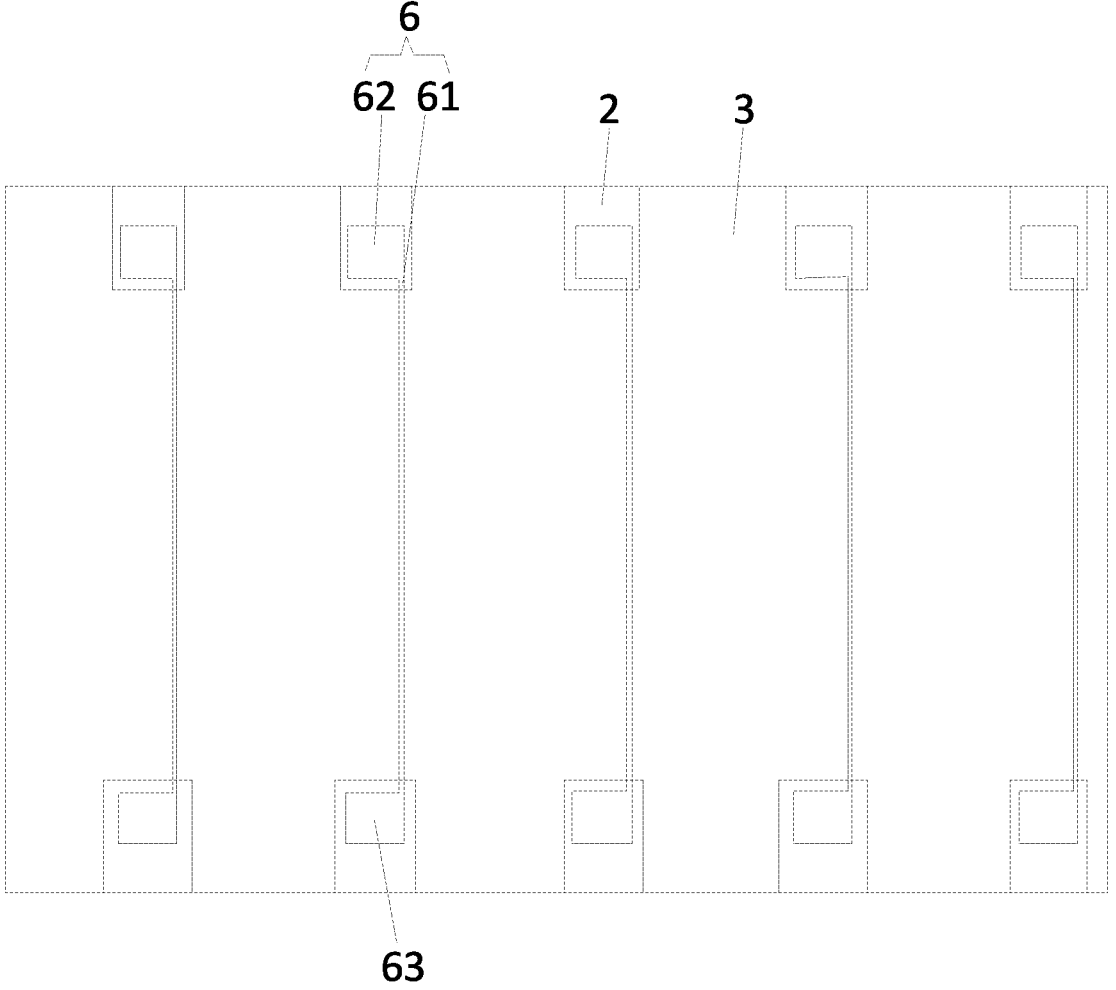
FIG. 11A is a planar structural diagram of yet another haptic feedback substrate according to an embodiment of the present disclosure.
Figure 11B:
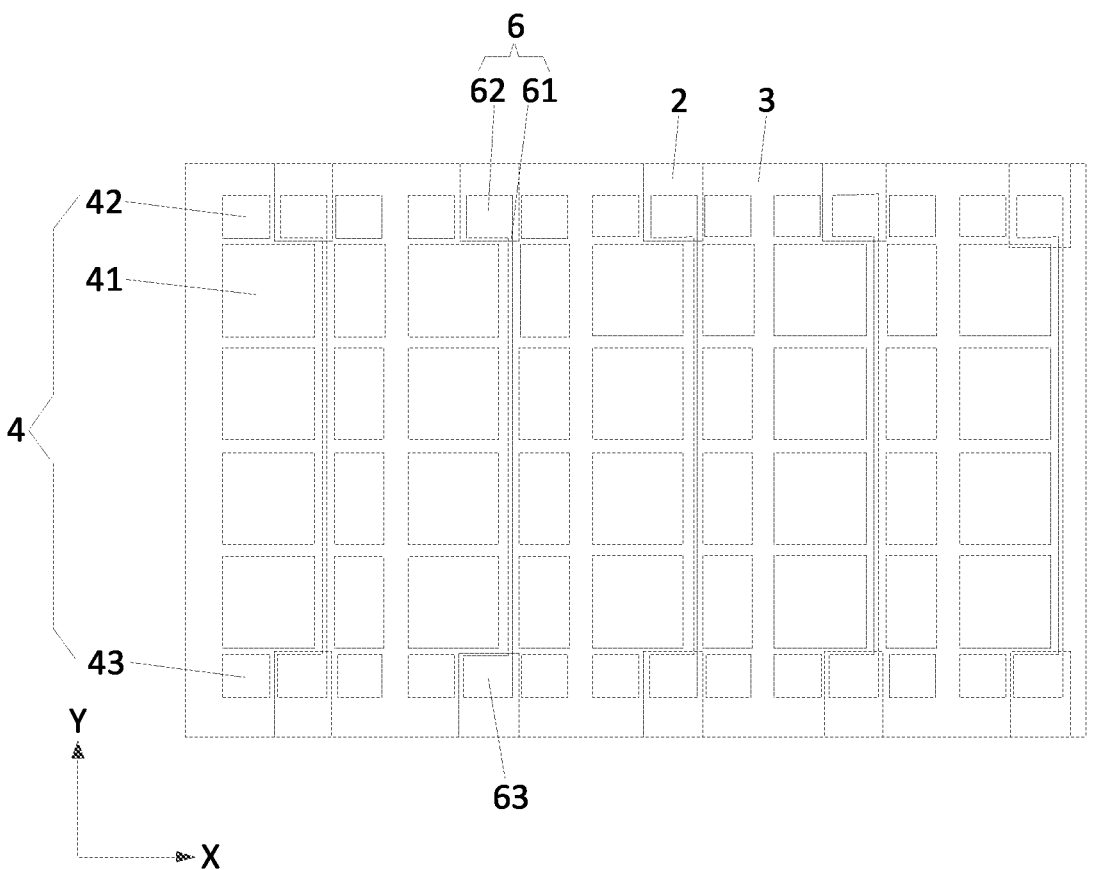
FIG. 11B is a planar structural diagram based on FIG. 11A.
Figure 11C:
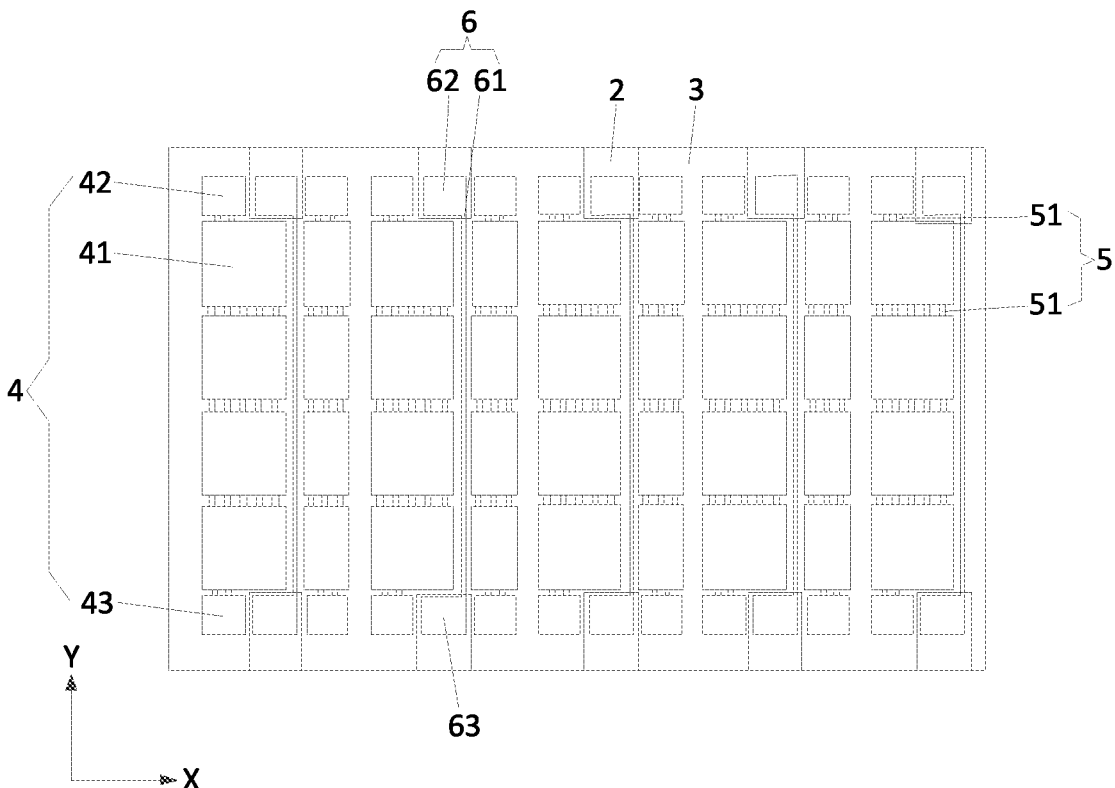
FIG. 11C is a planar structural diagram based on FIG. 11B.
Figure 12A:
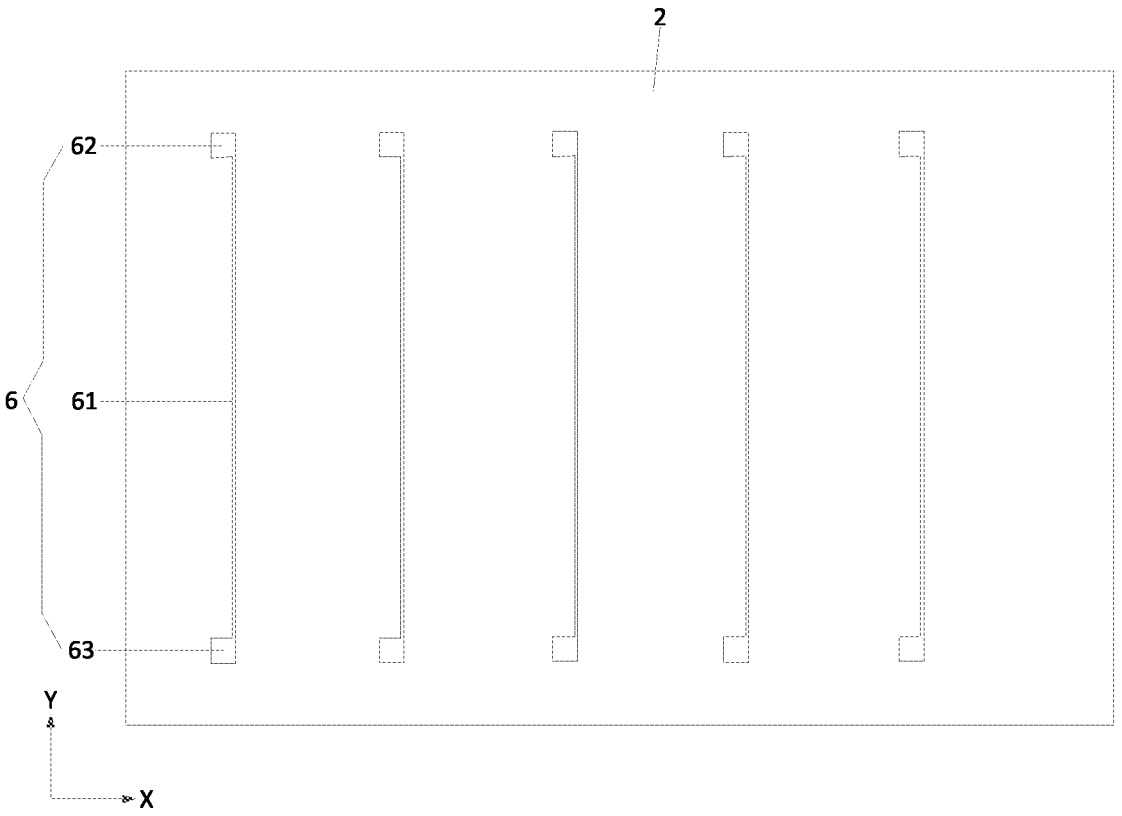
FIG. 12A is a planar structural diagram of yet another haptic feedback substrate according to an embodiment of the present disclosure.
Figure 12B:
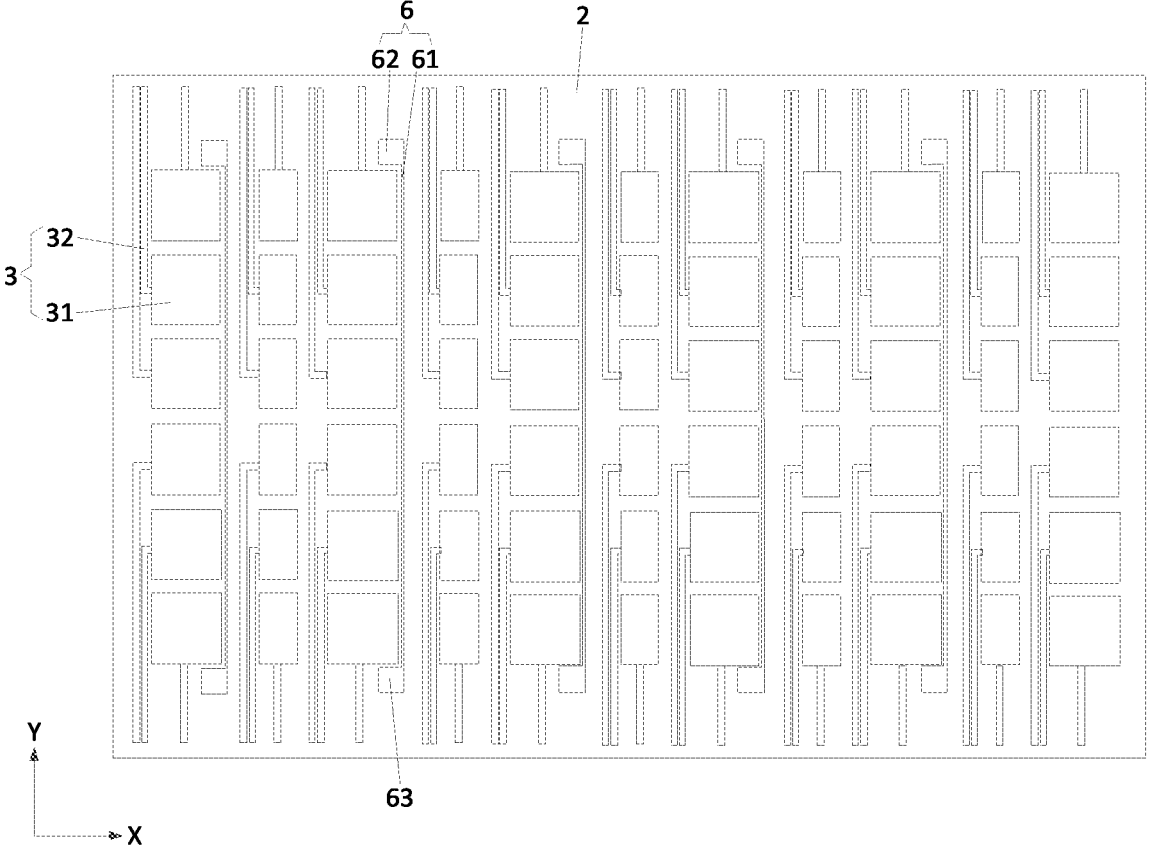
FIG. 12B is a planar structural diagram based on FIG. 12A.
Figure 12C:
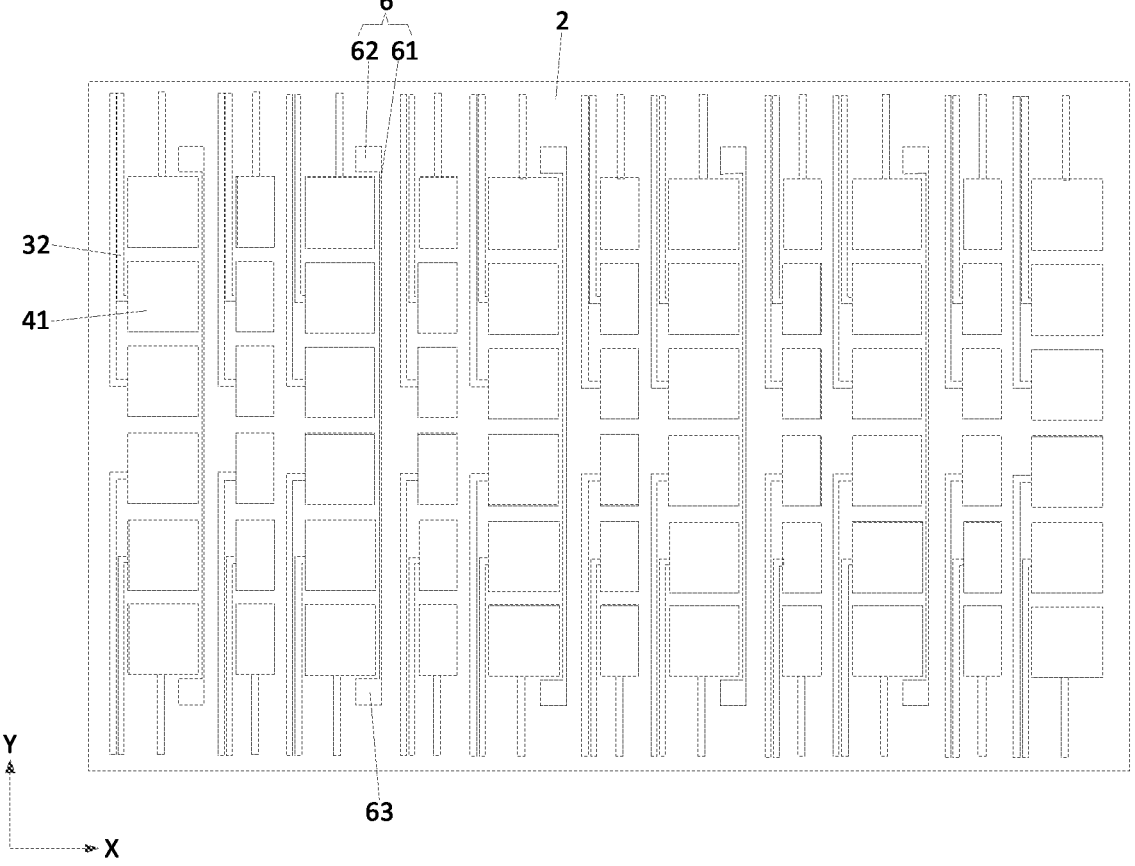
FIG. 12C is a planar structural diagram based on FIG. 12B.
Figure 12D:
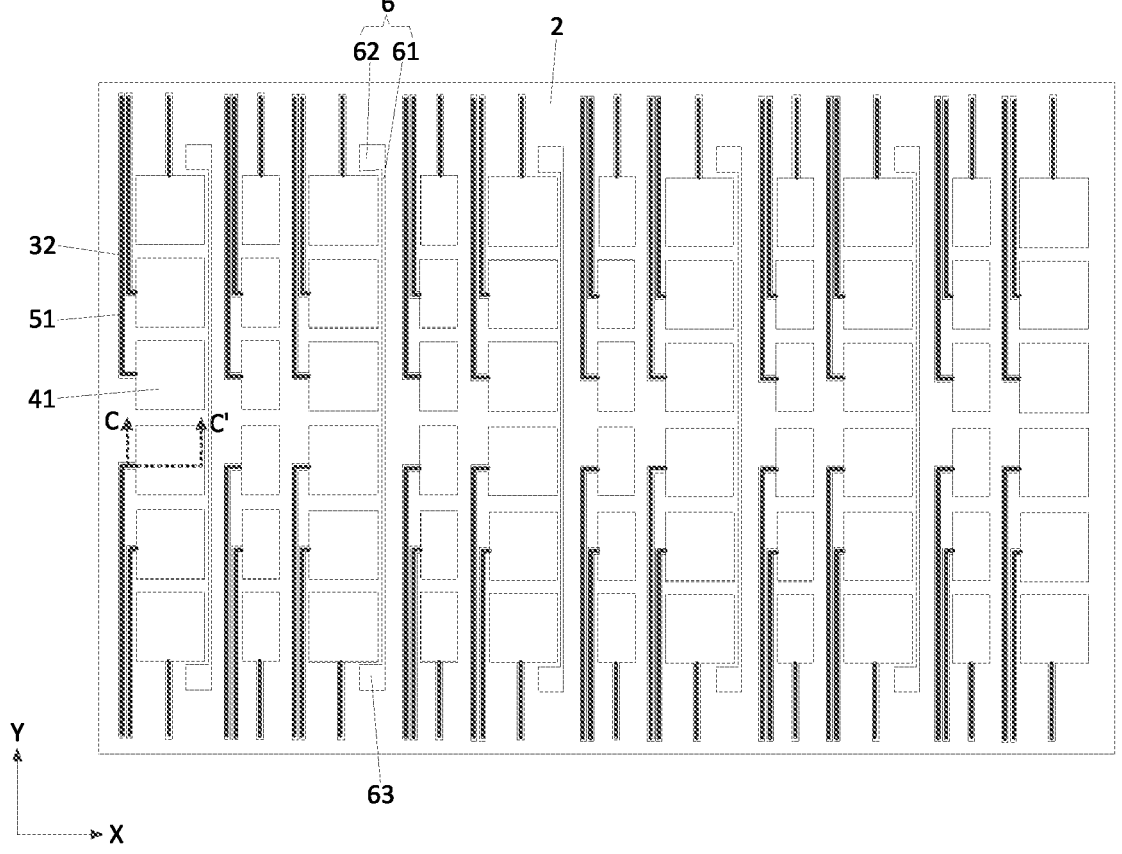
FIG. 12D is a planar structural diagram based on FIG. 12C.
Figure 13:
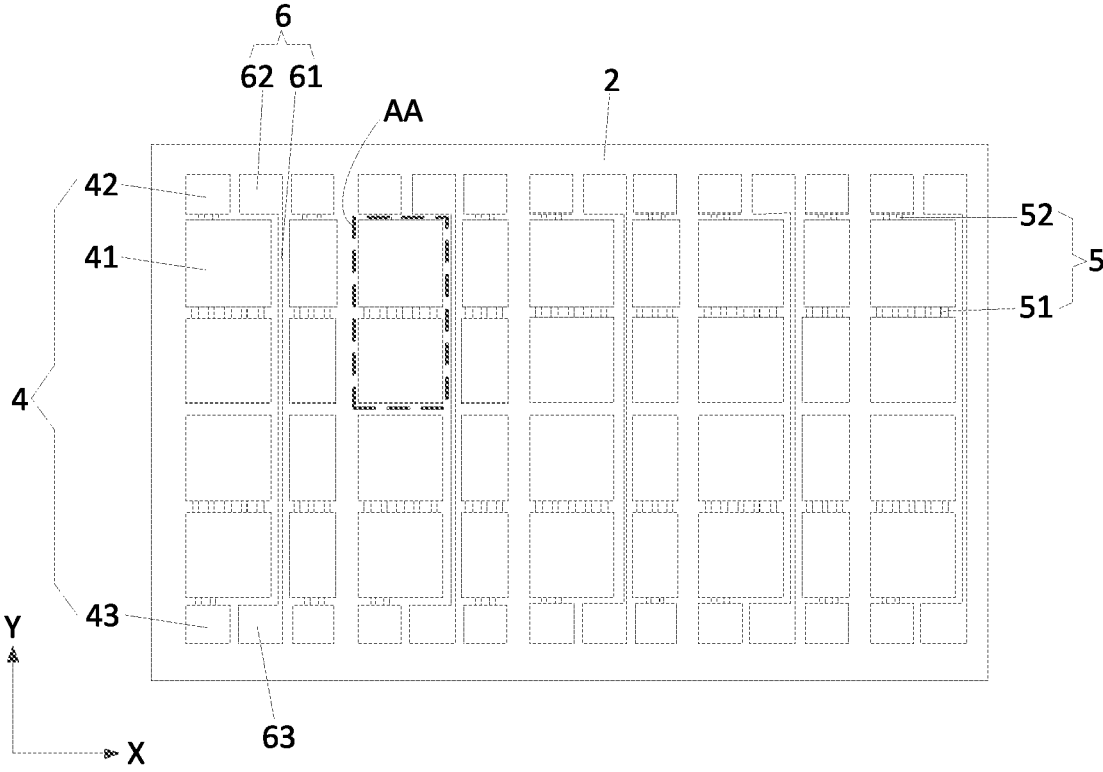
FIG. 13 is a planar structural diagram of yet another haptic feedback substrate according to an embodiment of the present disclosure.
Figure 14:
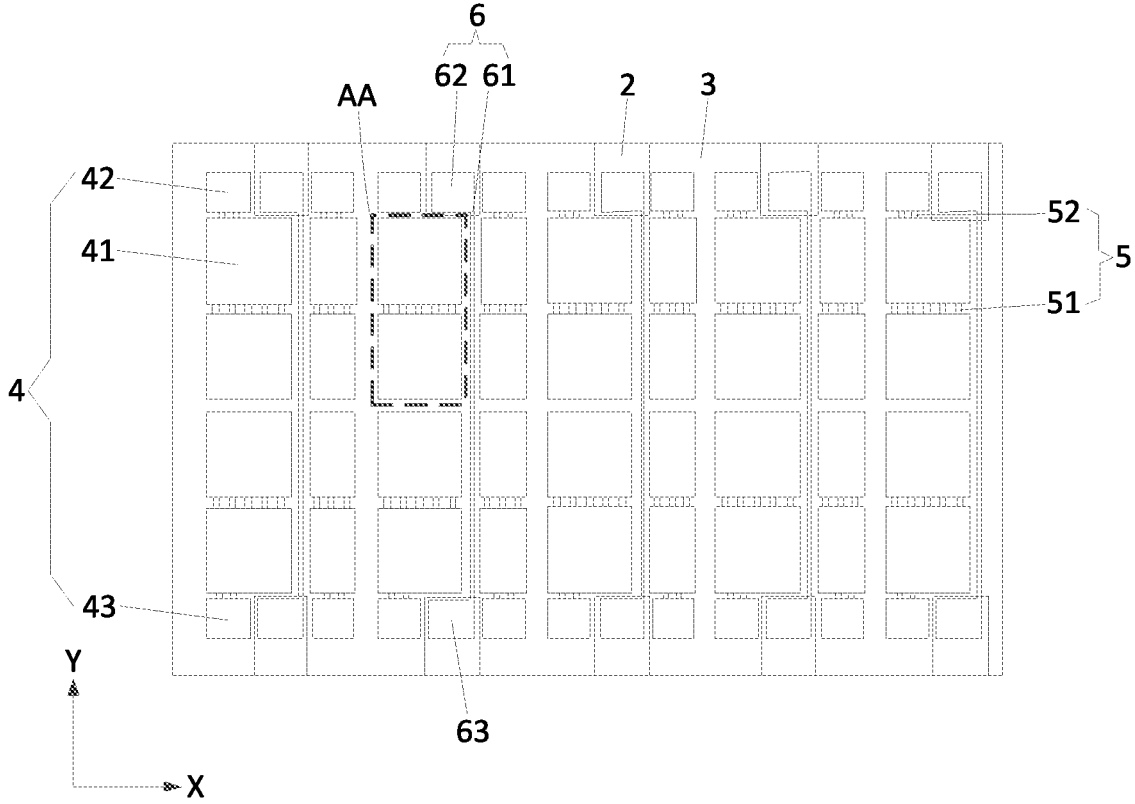
FIG. 14 is a planar structural diagram of yet another haptic feedback substrate according to an embodiment of the present disclosure.

When the haptic feedback substrate provided in embodiments of the present disclosure is configured to be integrated with the display device, in the haptic feedback substrate provided in embodiments of the present disclosure, as shown in FIGS. 10A-14, FIG. 10A shows a first electrode layer 2 and an auxiliary electrode layer 6 on a base substrate, FIG. 10B shows a piezoelectric film layer 3 based on FIG. 10A, FIG. 10C shows a second electrode layer 4 based on FIG. 10B, FIG. 10D shows a wiring layer 5 based on FIG. 10C, and FIG. 10D has an additional auxiliary electrode layer 6 compared with FIG. 4C; FIG. 11A shows a first electrode layer 2, an auxiliary electrode layer 6 and a piezoelectric film layer 3 on a base substrate, FIG. 11B shows a second electrode layer 4 based on FIG. 11A, FIG. 11C shows a wiring layer 5 based on FIG. 11B, and FIG. 11C has an additional auxiliary electrode layer 6 compared with FIG. 5C; FIG. 12A shows a first electrode layer 2 and an auxiliary electrode layer 6 on a base substrate, FIG. 12B shows a piezoelectric film layer 3 based on FIG. 12A, FIG. 12C shows a second electrode layer 4 based on FIG. 12B, FIG. 12D shows a wiring layer 5 based on FIG. 12C, and FIG. 12D has an additional auxiliary electrode layer 6 compared with FIG. 6C; and FIG. 13 shows an auxiliary electrode layer 6 based on FIG. 8C, and FIG. 14 shows an auxiliary electrode layer 6 based on FIG. 9B. The haptic feedback substrate further includes an auxiliary electrode layer 6 between the first electrode layer 2 and the piezoelectric film layer 3, where the auxiliary electrode layer 6 is electrically connected to the first electrode layer 2, and the auxiliary electrode layer 6 has higher conductivity than the first electrode layer 2. In this way, when the first electrode layer 2 is of an entire-surface structure and the first electrode layer 2 is made of transparent conductive materials such as ITO, the auxiliary electrode layer 6 is connected in parallel with the first electrode layer 2. The auxiliary electrode layer 6 has higher conductivity than the first electrode layer 2, and a resistance after parallel connection is smaller than a resistance of any one of the conductive layers, such that a resistance of the first electrode layer 2 may be reduced, the voltage drop of the first electrode layer 2 may be further effectively reduced, and uniformity of signal transmission may be improved.

During specific implementation, in the haptic feedback substrate provided in embodiments of the present disclosure, as shown in FIGS. 10A-14, the auxiliary electrode layer 6 may include a plurality of auxiliary wires 61 extending in a column direction Y and arranged in the row direction X, and all the auxiliary wires 61 are uniformly arranged, such that the voltage drop of the first electrode layer 2 may be further reduced, and a ground voltage signal may be transmitted to the first electrode layer 2 through each auxiliary wire 61, so as to further improve uniformity of signal transmission; and orthographic projections of all the auxiliary wires 61 on the base substrate 1 are located between orthographic projections of the two adjacent columns of second electrodes 41 on the base substrate 1 in a spaced manner, such that the overall thickness of the haptic feedback substrate may be reduced.

During specific implementation, in the haptic feedback substrate provided in embodiments of the present disclosure, as shown in FIGS. 10A-14, the auxiliary electrode layer 6 further includes: third binding parts 62 electrically connected to one ends of the auxiliary wires 61, and fourth binding parts 63 electrically connected to the other ends of the auxiliary wires 61; and the third binding parts 62 and/or the fourth binding parts 63 are electrically connected to the ground voltage input end. In some embodiments of the present disclosure, preferably, the third binding part 62 and the fourth binding part 63 are arranged at two ends of each auxiliary wire 61, respectively, such that the film layer on the base substrate 1 may be arranged more uniformly, and a vibration effect may be improved.

During specific implementation, in the haptic feedback substrate provided in embodiments of the present disclosure, as shown in FIGS. 11A-11C and 14, when the piezoelectric film layer 3 is of an entire-surface structure, the piezoelectric film layer 3 exposes the third binding parts 62 and the fourth binding parts 63, such that subsequent electrical connection between the third binding parts 62 and the ground voltage input end and between the fourth binding parts 63 and the ground voltage input end may be facilitated.

During specific implementation, in the haptic feedback substrate provided in embodiments of the present disclosure, as shown in FIGS. 10A-14, the third binding parts 62 and the fourth binding parts 63 are symmetrically arranged with respect to centers of the auxiliary wires 61. In this way, uniformity of a film layer arranged on the base substrate 1 may be further improved, and a vibration effect may be further improved.

During specific implementation, in the haptic feedback substrate provided in embodiments of the present disclosure, as shown in FIGS. 10A-14, the first electrode layer 2 may be made of a transparent material, and the auxiliary electrode layer 6 may be made of metal. In some embodiments, a material of the first electrode layer 2 may include at least one of ITO, IZO, IGZO, and AZO, and a material of the auxiliary electrode layer 6 may include at least one of Pb, Au, Ti, Ag, Mo, Cu, W, and Cr.

During specific implementation, in the haptic feedback substrate provided in embodiments of the present disclosure, the above-mentioned auxiliary electrode layer 6 may also be arranged between the first electrode layer 2 and the piezoelectric film layer 3 on the basis of FIG. 7B. Reference is made to the relevant description of the auxiliary electrode layer 6 for a principle, which will not be described in detail herein.

During specific implementation, the second electrode layer is generally made of ITO, which is not limited herein.

Certainly, during specific implementation, regardless of the transmittance of the device, the first electrode layer and the second electrode layer may be made of one of a Ti—Au alloy, a Ti—Al—Ti alloy, and a Ti—Mo alloy, or may be made of one of Ti, Au, Ag, Mo, Cu, W, and Cr. Those skilled in the art may provide the first electrode layer and the second electrode layer according to actual application needs, which are not limited herein.

During specific implementation, the wiring layer is generally made of a metal material, and specifically, Ti/Ni/Au, Ti/Au, or Ti/Al/Ti.

Figure 15:
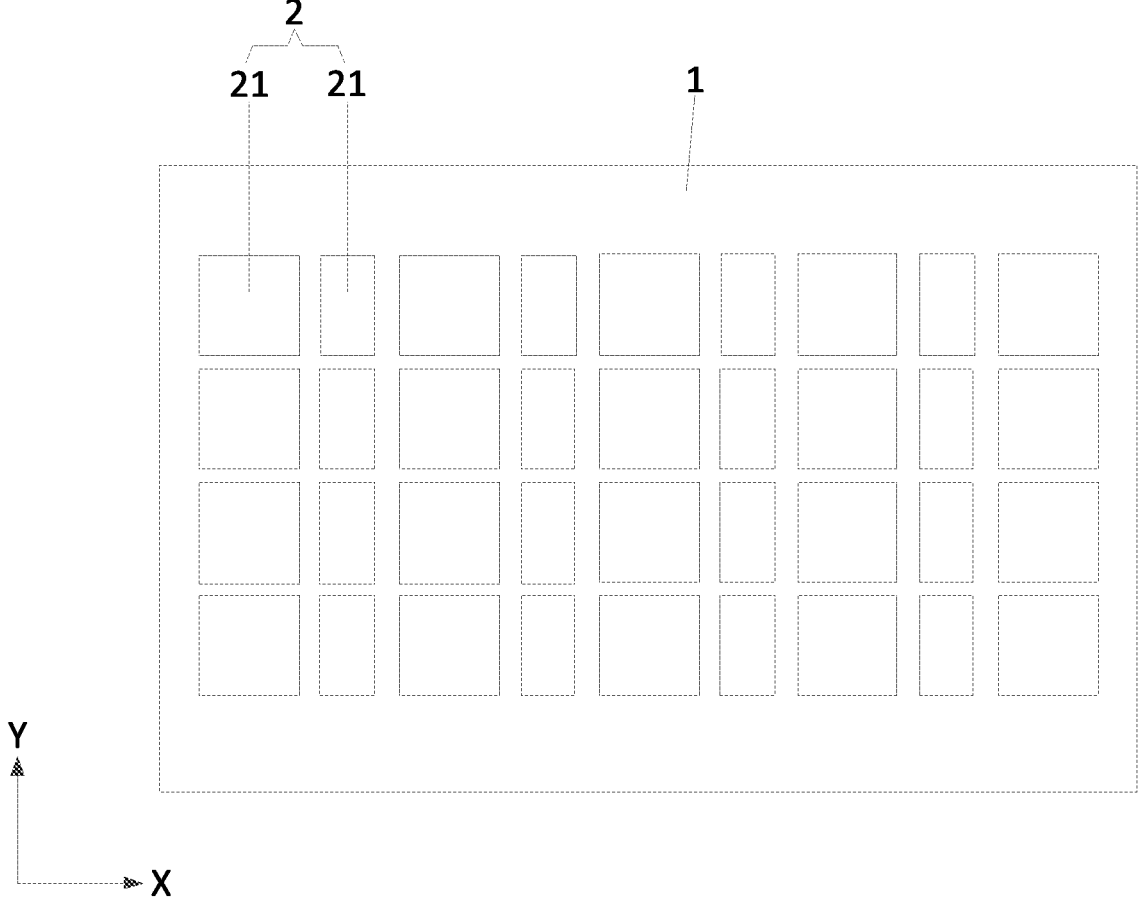
FIG. 15 is a schematic diagram of a patterned structure of a first electrode layer according to an embodiment of the present disclosure.

During specific implementation, in the haptic feedback substrate provided in embodiments of the present disclosure, as shown in FIG. 15, the first electrode layer 2 may include a plurality of first electrodes 21 distributed in an array, and the first electrodes 21 are in one-to-one correspondence to the second electrodes 41. In some embodiments, in the structures shown in FIGS. 4A-14, the first electrode layer 2 is of an entire-surface structure, for example. Certainly, the first electrode layer 2 in the structures shown in FIGS. 4A-14 may also be of the structure shown in FIG. 15, and all the first electrodes 21 may be electrically connected to the same ground voltage input end, which are limited herein.

During specific implementation, in the haptic feedback substrate provided in embodiments of the present disclosure, when the first electrode layer 2 in the structures shown in FIGS. 4A-14 is of an structure shown in FIG. 15, orthographic projections of the first electrodes 21 on the base substrate 1 substantially overlap the orthographic projections of the second electrodes 41 on the base substrate, such that the piezoelectric film layer vibrates under the action of the alternating electric field formed between the first electrode layer and the second electrode layer and drives the base substrate to resonate, so as to achieve haptic feedback.

In some embodiments, when the first electrode layer 2 is of a patterned structure shown in FIG. 15, the first electrode layer 2 may be made of a transparent material. For example, the material of the first electrode layer 2 may include at least one of ITO, IZO, IGZO, and AZO. Certainly, regardless of the transmittance of the device, the first electrode layer 2 may be made of one of a Ti—Au alloy, a Ti—Al—Ti alloy, and a Ti—Mo alloy, or may be made of one of Ti, Au, Ag, Mo, Cu, W, and Cr. Those skilled in the art may provide the material of the first electrode layer according to actual application needs, which are not limited herein.

It should be noted that when the first patterned electrode layer 2 is made of a transparent conductive material, the above-mentioned auxiliary electrode layer may also be manufactured to further reduce the resistance.

It should be noted that since a resistance of a metal material is much smaller than that of the transparent conductive material, when the first electrode layer is made of metal, it is generally unnecessary to manufacture an auxiliary electrode layer, regardless of whether the first electrode layer is of an entire-surface structure or a patterned structure.

During specific implementation, a material of the piezoelectric film layer may be $Pb(Zr,Ti)O_3$ (PZT), or at least one of AlN, ZnO, $BaTiO_3$, $PbTiO_3$, $KNbO_3$, $LiNbO_3$, $LiTaO_3$, and $La_3Ga_5SiO_{14}$. Specifically, a material for making the piezoelectric film layer may be selected according to actual use needs of those skilled in the art, which is not limited herein. When the PZT is used for making the piezoelectric film layer, a high piezoelectric coefficient of the PZT ensures the corresponding piezoelectric characteristics of the haptic feedback substrate, such that the corresponding haptic feedback substrate may be used in a haptic feedback device; and the PZT has a high light transmittance, such that display quality of a display device is not influenced when the PZT is integrated into the display device.

Figure 16:
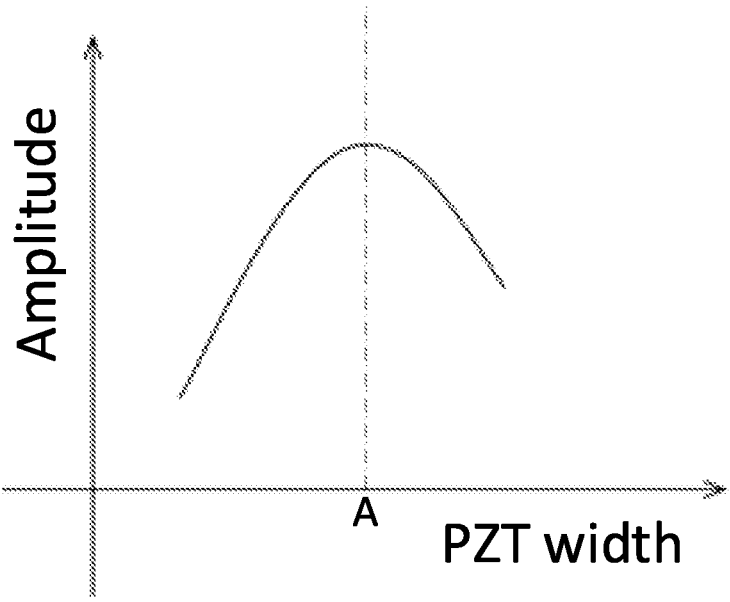
FIG. 16 is a schematic diagram of a relation between a thickness of a piezoelectric film layer and an amplitude of vibration of a base substrate according to an embodiment of the present disclosure.

During specific implementation, when the piezoelectric film layers of the haptic feedback substrate provided in the embodiment of the present disclosure are manufactured, a length of the piezoelectric film layers may be fixed. The amplitude of the base substrate during vibration may be obtained by manufacturing the piezoelectric film layers having different widths. It may be found that the amplitude of the base substrate is the highest when the piezoelectric film layer has a certain width (A), and the amplitude of the base substrate is smaller when a width of the piezoelectric film layer is greater than or smaller than the above width, as shown in FIG. 16. FIG. 16 is a schematic diagram of a relation between a width (PZT width) of a piezoelectric film layer and an amplitude of a base substrate.

During specific implementation, in the haptic feedback substrate provided in embodiments of the present disclosure, when the piezoelectric devices are arranged at positions of both the wave peak and the wave trough, the piezoelectric device at the position of the wave peak may have the same size as the piezoelectric device at the position of the wave trough, and alternatively, the piezoelectric device at the position of the wave peak may have a greater size than the piezoelectric device at the position of the wave trough.

In some embodiments, as shown in FIGS. 4C, 5C, 6C, 7B, 8C and 9B, for example, if the piezoelectric device at the position of the wave peak has a greater size than the piezoelectric device at the position of the wave trough, the piezoelectric device at the position of the wave peak is denoted by reference numeral A, the piezoelectric device at the position of the wave trough is denoted by reference numeral B, A and B are of the same structure and are each composed of the first electrode layer 2, the piezoelectric film layer 3 and the second electrode layer 4 that overlap each other, but A has a greater size than B, such that the piezoelectric device A at the position of the wave peak may be configured to drive the base substrate 1 to vibrate, and the piezoelectric device B at the position of the wave trough may be configured to serve as a pressure detector. In some embodiments, when pressure detection needs to be conducted, an alternating current voltage signal may be loaded only to the piezoelectric device A at the position of the wave peak, and no alternating current voltage signal may be loaded to the piezoelectric device B at the position of the wave trough, such that the piezoelectric device A at the position of the wave peak vibrates to drive the base substrate 1 to vibrate so as to achieve haptic feedback, the piezoelectric device B at the position of the wave trough may achieve pressure detection through a positive piezoelectric effect of the piezoelectric film layer 3, and further the haptic feedback and pressure detection may be conducted simultaneously. The piezoelectric device B at the position of the wave trough is only used for pressure detection, such that the piezoelectric device B at the position of the wave trough may be set to have a small size, and the piezoelectric device A at the position of the wave peak may be set to have a great size, which may improve a haptic feedback effect.

Figure 17:
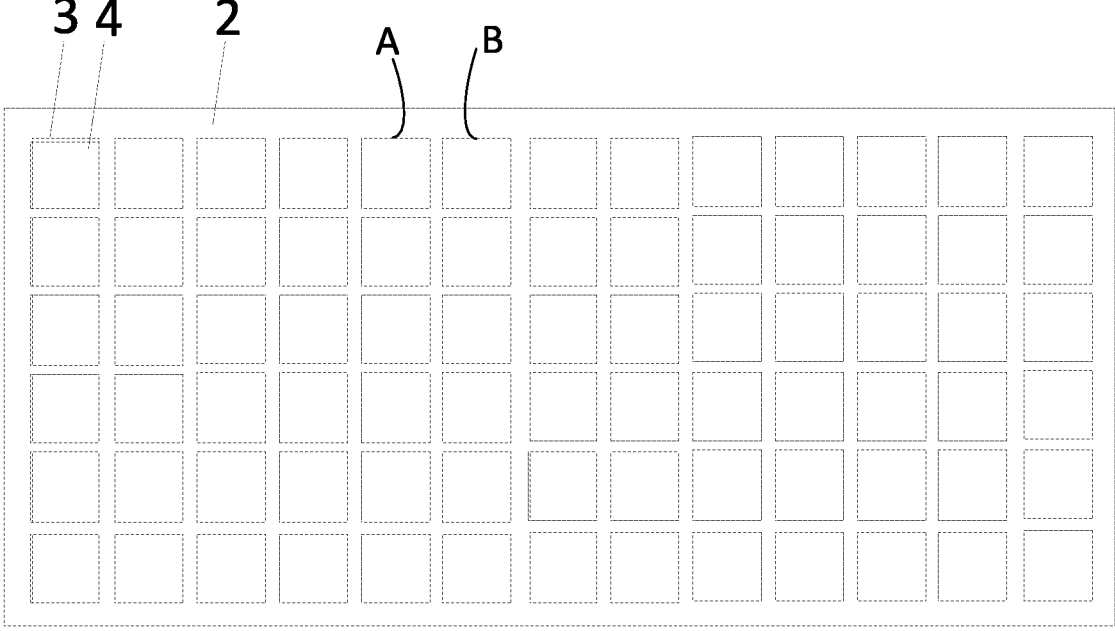
FIG. 17 is a planar structural diagram of yet another haptic feedback substrate according to an embodiment of the present disclosure.
Figure 18:
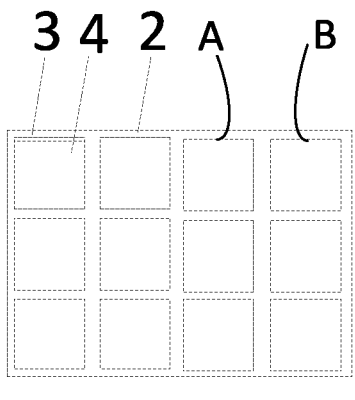
FIG. 18 is a planar structural diagram of still another haptic feedback substrate according to an embodiment of the present disclosure.

In some embodiments, as shown in FIGS. 17 and 18, when the piezoelectric device A at the position of the wave peak has the same size as the piezoelectric device B at the position of the wave trough, and both the piezoelectric device A at the position of the wave peak and the piezoelectric device B at the position of the wave trough are used for haptic feedback, an alternating current voltage signal loaded to the piezoelectric device A at the position of the wave peak has the same frequency as an alternating current voltage signal loaded to the piezoelectric device B at the position of the wave trough, and a phase difference between the alternating current voltage signal loaded to the piezoelectric device A at the position of the wave peak and the alternating current voltage signal loaded to the piezoelectric device B at the position of the wave trough is 180°, such that the vibration effect of the base substrate 1 along the wave peak and the wave trough may be achieved.

The haptic feedback substrate provided in embodiments of the present disclosure may be applied to medical treatment, automotive electronics, motion tracking systems, and other fields. The haptic feedback substrate is especially suitable for the field of wearable devices, monitoring and medical treatment outside or implanted in human bodies, or fields of electronic skin of artificial intelligence. Specifically, the haptic feedback substrate may be applied to brake pads, keyboards, mobile terminals, game consoles, vehicles and other apparatuses that may generate vibration and mechanical characteristics.

Based on the same inventive concept, an embodiment of the present disclosure further provides a haptic feedback apparatus, which includes the haptic feedback substrate provided in embodiments of the present disclosure. A problem solving principle of the haptic feedback apparatus is similar to that of the haptic feedback substrate, so reference may be made to implementation of the haptic feedback substrate for implementation of the haptic feedback apparatus, which will not be repeated herein. The haptic feedback apparatus may be any product or component having a display or touch function, such as a mobile phone, a tablet computer, a television, a display, a notebook computer, a digital photo frame, and a navigator.

During specific implementation, the haptic feedback apparatus provided in embodiments of the present disclosure may further include other functional structures that are familiar to those skilled in the art, which will not be described in detail herein.

During specific implementation, the haptic feedback apparatus may be combined with a touch screen, and a touch position of a human body may be determined by means of the touch screen, such that corresponding vibration waveform, amplitude and frequency may be generated, and human-computer interaction may be achieved. For another example, the touch position of the human body is determined by means of the haptic feedback substrate in the haptic feedback apparatus, such that the corresponding vibration waveform, amplitude and frequency may be generated, and human-computer interaction may be achieved. Certainly, the haptic feedback apparatus may further be applied to medical treatment, automotive electronics, motion tracking systems and other fields according to actual needs, which will not be described in detail herein.

Some embodiments of the present disclosure provide the haptic feedback substrate and the haptic feedback apparatus, the second electrode layer 4 is divided into the plurality of vibration zones AA, each vibration zone AA includes at least one second electrode 41, the second electrodes 41 in each vibration zone AA are electrically connected to the same drive voltage input end, and the second electrodes 41 in different vibration zones AA are electrically connected to different drive voltage input ends. In this way, the piezoelectric device may be driven in a zoned manner, such that on one hand, overall power consumption of the device may be reduced, and on the other hand, fine control of a haptic feedback effect may be facilitated.

Although preferred embodiments of the present disclosure have been described, those skilled in the art can still make additional changes and modifications to the embodiments once they learn the basic inventive concept. Therefore, the appended claims are intended to be interpreted as including the preferred embodiments and all changes and modifications falling within the scope of the present disclosure.

Apparently, those skilled in the art can make various modifications and variations to the embodiments of the present disclosure without departing from the spirit and scope of the embodiments of the present disclosure. In this way, if these modifications and variations of the embodiments of the present disclosure fall within the scope of the claims of the present disclosure and their equivalent technologies, the present disclosure is also intended to include these modifications and variations.

What is claimed is:

1. A haptic feedback substrate, comprising:
   a base substrate;
   a first electrode layer on the base substrate, wherein the first electrode layer is electrically connected to a ground voltage input end;
   a piezoelectric film layer at one side facing away from the base substrate, of the first electrode layer; and
   a second electrode layer at one side facing away from the base substrate, of the piezoelectric film layer, wherein the second electrode layer is divided into a plurality of vibration zones, each of the plurality of vibration zones comprises at least one second electrode, the at least one second electrode in each of the plurality of vibration zones is electrically connected to a same drive voltage input end, and second electrodes in different vibration zones are electrically connected to different drive voltage input ends; wherein the first electrode layer and the second electrode layer are configured to form an alternating electric field, and the piezoelectric film layer is configured to vibrate under an action of the alternating electric field and drive the base substrate to resonate;
   wherein the haptic feedback substrate further comprises:
   further comprising a wiring layer at one side facing away from the base substrate, of the piezoelectric film layer, wherein the wiring layer comprises a plurality of wires, and the at least one second electrode in each of the plurality of vibration zones is electrically connected to the same drive voltage input end through the wires;
   wherein the piezoelectric film layer comprises piezoelectric connectors, and orthographic projections of the wires on the base substrate are within a range of orthographic projections of the piezoelectric connectors on the base substrate.

2. The haptic feedback substrate according to claim 1, wherein the piezoelectric film layer further comprises a plurality of piezoelectric parts distributed in an array, and orthographic projections of the piezoelectric parts on the base substrate overlap orthographic projections of the second electrodes on the base substrate; and
   the piezoelectric parts are connected to the piezoelectric connectors, and the piezoelectric connector is arranged between adjacent piezoelectric parts;
   or
   the piezoelectric film layer further comprises a plurality of piezoelectric parts distributed in an array, and the plurality of piezoelectric parts and the connectors are of an integrally formed entire-surface structure.

3. The haptic feedback substrate according to claim 2, wherein the orthographic projections of the piezoelectric connectors on the base substrate are in one-to-one correspondence to the orthographic projections of the wires on the base substrate.

4. The haptic feedback substrate according to claim 1, wherein each of the plurality of vibration zones comprises a plurality of second electrodes, the plurality of second electrodes constitute one column, and two adjacent second electrodes in a same column are electrically connected through the wires.

5. The haptic feedback substrate according to claim 4, wherein the two adjacent second electrodes in the same column are electrically connected through a plurality of independent wires arranged in a row direction.

6. The haptic feedback substrate according to claim 4, wherein orthographic projections of the plurality of independent wires arranged in the row direction on the base substrate are between orthographic projections of the two adjacent second electrodes on the base substrate.

7. The haptic feedback substrate according to claim 4, wherein in response to the piezoelectric film layer comprising the plurality of piezoelectric parts distributed in an array, the piezoelectric film layer further comprises piezoelectric buffer parts respectively at one end of a first piezoelectric part and one end of a last piezoelectric part in a same column of piezoelectric parts, and the piezoelectric buffer parts are connected to the piezoelectric parts through a plurality of independent piezoelectric connectors arranged in the row direction;

the haptic feedback substrate further comprises first binding parts and second binding parts arranged on a layer same as a layer on which the second electrodes are, and the first binding parts and the second binding parts are on corresponding piezoelectric buffer parts, respectively; and the first binding parts are electrically connected to the second electrodes through a plurality of independent wires arranged in the row direction, the second binding parts are electrically connected to the second electrodes through a plurality of independent wires arranged in the row direction, and the first binding parts and/or the second binding parts are electrically connected to the drive voltage input ends;

or in response to the piezoelectric film layer being of an entire-surface structure, the haptic feedback substrate further comprises first binding parts and second binding parts arranged on a layer same as a layer on which the second electrodes are, and the first binding parts and the second binding parts are on the piezoelectric film layer separately; and the first binding parts are electrically connected to the second electrodes through a plurality of independent wires arranged in the row direction, the second binding parts are electrically connected to the second electrodes through a plurality of independent wires arranged in the row direction, and the first binding parts and/or the second binding parts are electrically connected to the drive voltage input ends.

8. The haptic feedback substrate according to claim 7, wherein a first binding part and a second binding part that are electrically connected to each column of second electrodes are symmetrically arranged with respect to a center line of the base substrate in the row direction.

9. The haptic feedback substrate according to claim 7, wherein a size of the piezoelectric buffer parts is smaller than a size of the piezoelectric parts.

10. The haptic feedback substrate according to claim 1, wherein each of the plurality of vibration zones comprises one second electrode, and all the second electrodes are electrically connected to different wires.

11. The haptic feedback substrate according to claim 10, wherein all the second electrodes are distributed in an array, the wires electrically connected to a first row of second electrodes and a last row of second electrodes are directly led out from ends of the first row of second electrodes and the last row of second electrodes, and the wires electrically connected to the other rows of second electrodes are led out from gaps between two adjacent columns of second electrodes.

12. The haptic feedback substrate according to claim 11, wherein in the other rows of second electrodes, the wires electrically connected to some rows of second electrodes are led out to one side of the first row of second electrodes, and the wires electrically connected to the other rows of second electrodes are led out to one side of the last row of second electrodes.

13. The haptic feedback substrate according to claim 1, wherein each of the plurality of vibration zones comprises at least two second electrodes in a same column, the plurality of vibration zones in a same column are independent of each other, and two adjacent second electrodes in each of the plurality of vibration zones are electrically connected through the wires.

14. The haptic feedback substrate according to claim 13, wherein two adjacent second electrodes in each of the plurality of vibration zones are electrically connected through a plurality of independent wires arranged in a row direction.

15. The haptic feedback substrate according to claim 14, wherein orthographic projections of the plurality of independent wires arranged in the row direction on the base substrate are between orthographic projections of the two adjacent second electrodes on the base substrate.

16. The haptic feedback substrate according to claim 1, wherein the first electrode layer is of an entire-surface structure.

17. The haptic feedback substrate according to claim 16, further comprising an auxiliary electrode layer between the first electrode layer and the piezoelectric film layer, wherein the auxiliary electrode layer is electrically connected to the first electrode layer, and a conductivity of the auxiliary electrode layer is higher than a conductivity of the first electrode layer.

18. The haptic feedback substrate according to claim 17, wherein the auxiliary electrode layer comprises a plurality of auxiliary wires extending in a column direction and arranged in the row direction, all the auxiliary wires are uniformly arranged, and orthographic projections of all the auxiliary wires on the base substrate are between orthographic projections of the two adjacent columns of second electrodes on the base substrate in a spaced manner.

19. The haptic feedback substrate according to claim 18, wherein the auxiliary electrode layer further comprises: third binding parts electrically connected to one ends of the auxiliary wires, and fourth binding parts electrically connected to the other ends of the auxiliary wires; and the third binding parts and/or the fourth binding parts are electrically connected to the ground voltage input end.

20. The haptic feedback substrate according to claim 17, wherein the first electrode layer is made of a transparent conductive material, and the auxiliary electrode layer is made of metal.

21. The haptic feedback substrate according to claim 20, wherein a material of the first electrode layer comprises at least one of ITO, IZO, IGZO, or AZO, and a material of the auxiliary electrode layer comprises at least one of Pb, Au, Ti, Ag, Mo, Cu, W, or Cr.

22. The haptic feedback substrate according to claim 1, wherein overlapping parts of the first electrode layer, the piezoelectric film layer and the second electrode layer constitute a piezoelectric device, and the piezoelectric device is arranged at a position of a wave peak and/or wave trough of vibration of the base substrate.

23. The haptic feedback substrate according to claim 22, wherein in response to the piezoelectric devices being arranged at positions of both the wave peak and the wave trough, a size of the piezoelectric device at the position of the wave peak is identical to a size of the piezoelectric device at the position of the wave trough, or a size of the piezoelectric device at the position of the wave peak is greater than a size of the piezoelectric device at the position of the wave trough.

24. The haptic feedback substrate according to claim 23, wherein in response to the size of the piezoelectric device at the position of the wave peak being greater than the size of the piezoelectric device at the position of the wave trough, the piezoelectric device at the position of the wave peak is configured to drive the base substrate to vibrate, and the piezoelectric device at the position of the wave trough is configured to serve as a pressure detector.

25. The haptic feedback substrate according to claim 23, wherein a material of the piezoelectric film layer comprises at least one of $Pb(Zr,Ti)O_3$, AlN, ZnO, $BaTiO_3$, $PbTiO_3$, $KNbO_3$, $LiNbO_3$, $LiTaO_3$, or $La_3Ga_5SiO_{14}$.

26. A haptic feedback apparatus, comprising the haptic feedback substrate according to claim 1.

* * * * *